(12) United States Patent
Castaneda et al.

(10) Patent No.: US 12,235,908 B2
(45) Date of Patent: *Feb. 25, 2025

(54) SYSTEMS AND METHODS FOR DISPLAYING SUPPLEMENTAL CONTENT FOR AN ELECTRONIC BOOK

(71) Applicant: Adeia Guides Inc., San Jose, CA (US)

(72) Inventors: Evangeline Castaneda, West Chester, PA (US); Jennifer L. Holloway, Wallingford, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,628

(22) Filed: Jan. 5, 2021

(65) Prior Publication Data

US 2021/0157864 A1    May 27, 2021

Related U.S. Application Data

(63) Continuation of application No. 15/818,379, filed on Nov. 20, 2017, now Pat. No. 10,909,191.

(51) Int. Cl.
| | | |
|---|---|---|
| *G06F 7/00* | (2006.01) | |
| *G06F 16/48* | (2019.01) | |
| *G06F 16/9038* | (2019.01) | |
| *G06F 16/951* | (2019.01) | |
| *G06F 40/205* | (2020.01) | |
| *G06F 40/279* | (2020.01) | |

(Continued)

(52) U.S. Cl.
CPC ............ *G06F 16/951* (2019.01); *G06F 16/48* (2019.01); *G06F 16/9038* (2019.01); *G06F 40/205* (2020.01); *G06F 40/279* (2020.01); *G06F 3/0482* (2013.01); *G06F 3/0483* (2013.01)

(58) Field of Classification Search
CPC .... G06F 16/951; G06F 16/48; G06F 16/9038; G06F 17/2765; G06F 16/9535; G06F 16/435; G06F 16/335; G06F 17/338; G06F 16/3344

See application file for complete search history.

(56) References Cited

U.S. PATENT DOCUMENTS 5,893,109 A * 4/1999 DeRose ............... G06F 16/9577
                                                       707/999.102
6,239,794 B1  5/2001 Yuen et al.
(Continued)

FOREIGN PATENT DOCUMENTS

| CN | 103020270 A | 4/2013 |
|---|---|---|
| CN | 105612517 A | 5/2016 |

(Continued)

OTHER PUBLICATIONS

Barker, Phil, "Where to put your EPUB metadata", XPO55929685, Retrieved from the Internet: URL:http://web.archive.org/web/20160407072909/http://blogs.pjjk.net/phil/where-to-put-your-epub-metadata/, pp. 1-5, Apr. 7, 2016.

*Primary Examiner* — Mohammed R Uddin
(74) *Attorney, Agent, or Firm* — Haley Guiliano LLP

(57) ABSTRACT

Supplemental content related to an electronic book may be obtained by creating a search query using a keyword in selected text of the electronic book. The search query may also include details about the electronic book obtained from a manifest file for the electronic book, including the location of the selected text.

20 Claims, 13 Drawing Sheets

(51) Int. Cl.
  *G06F 3/0482* (2013.01)
  *G06F 3/0483* (2013.01)

(56) References Cited

U.S. PATENT DOCUMENTS

| | | | |
|---|---|---|---|
| 6,564,378 B1 | 5/2003 | Satterfield et al. | |
| 6,938,005 B2* | 8/2005 | Iverson | G06Q 30/0625 |
| | | | 705/26.1 |
| 7,165,098 B1 | 1/2007 | Boyer et al. | |
| 7,287,214 B1* | 10/2007 | Jenkins | G06F 16/284 |
| | | | 715/205 |
| 7,761,892 B2 | 7/2010 | Ellis et al. | |
| 8,046,801 B2 | 10/2011 | Ellis et al. | |
| 8,250,071 B1* | 8/2012 | Killalea | G06F 40/30 |
| | | | 707/726 |
| 8,352,449 B1* | 1/2013 | Parekh | G06F 16/951 |
| | | | 707/715 |
| 8,542,205 B1* | 9/2013 | Keller | G06F 16/332 |
| | | | 345/173 |
| 8,856,039 B1* | 10/2014 | Talreja | G06F 16/972 |
| | | | 705/27.1 |
| 9,053,190 B1* | 6/2015 | Boenau | G06F 16/9535 |
| 9,116,654 B1* | 8/2015 | Shah | G06F 3/0483 |
| 9,117,195 B2 | 8/2015 | Casey | |
| 9,342,233 B1* | 5/2016 | Dimson | G06F 3/0488 |
| 9,449,526 B1* | 9/2016 | Tseng | G06F 16/3328 |
| 9,471,203 B1* | 10/2016 | O'Dell, III | G06F 16/4393 |
| 9,495,322 B1* | 11/2016 | Belin | G06F 1/1613 |
| 9,575,615 B1* | 2/2017 | Nicholls | G06F 3/048 |
| 9,607,105 B1* | 3/2017 | Dass | G06F 16/332 |
| 9,613,003 B1* | 4/2017 | Goodspeed | G06F 16/9038 |
| 9,690,758 B2 | 6/2017 | Pyo | |
| 9,697,265 B2 | 7/2017 | Story et al. | |
| 9,734,153 B2 | 8/2017 | Hwang et al. | |
| 9,892,094 B2* | 2/2018 | Jones | G06V 30/418 |
| 9,916,382 B1* | 3/2018 | Clarke | G06F 16/40 |
| 10,380,167 B1* | 8/2019 | Rottman | H04L 67/306 |
| 2001/0047373 A1* | 11/2001 | Jones | G06F 40/103 |
| | | | 715/255 |
| 2002/0174430 A1 | 11/2002 | Ellis et al. | |
| 2002/0184189 A1* | 12/2002 | Hay | G06Q 50/20 |
| 2004/0268253 A1* | 12/2004 | DeMello | G06F 40/169 |
| | | | 715/205 |
| 2005/0251827 A1 | 11/2005 | Ellis et al. | |
| 2006/0053364 A1* | 3/2006 | Hollander | G06F 40/169 |
| | | | 715/230 |
| 2007/0150456 A1* | 6/2007 | Lian | G09B 5/06 |
| 2007/0180471 A1* | 8/2007 | Unz | H04L 67/06 |
| | | | 725/52 |
| 2007/0204211 A1* | 8/2007 | Paxson | G06F 40/131 |
| | | | 707/999.1 |
| 2008/0243788 A1 | 10/2008 | Reztlaff et al. | |
| 2009/0248640 A1* | 10/2009 | Porat | G06F 16/33 |
| 2010/0005493 A1 | 1/2010 | He | |
| 2010/0153885 A1 | 6/2010 | Yates | |
| 2010/0278453 A1* | 11/2010 | King | G06F 40/197 |
| | | | 715/230 |
| 2010/0315359 A1* | 12/2010 | Seong | G06F 21/10 |
| | | | 345/173 |
| 2010/0333133 A1* | 12/2010 | Krakirian | H04N 7/17318 |
| | | | 725/87 |
| 2011/0231752 A1* | 9/2011 | Kung | G06F 3/1462 |
| | | | 715/243 |
| 2012/0046947 A1* | 2/2012 | Fleizach | G10L 13/00 |
| | | | 704/E13.011 |
| 2012/0078612 A1* | 3/2012 | Kandekar | G06F 40/258 |
| | | | 704/9 |
| 2012/0137246 A1* | 5/2012 | Pyo | G01C 21/362 |
| | | | 715/776 |
| 2012/0173578 A1* | 7/2012 | Cheong | G06F 16/313 |
| | | | 707/E17.014 |
| 2012/0240025 A1* | 9/2012 | Migos | G06F 3/0488 |
| | | | 715/230 |
| 2012/0240036 A1 | 9/2012 | Howard et al. | |
| 2012/0272185 A1* | 10/2012 | Dodson | H04N 21/44204 |
| | | | 715/810 |
| 2012/0284276 A1* | 11/2012 | Fernando | G06F 16/41 |
| | | | 707/741 |
| 2012/0311438 A1* | 12/2012 | Cranfill | G06F 3/0488 |
| | | | 715/256 |
| 2013/0031208 A1* | 1/2013 | Linton | G09B 7/02 |
| | | | 709/217 |
| 2013/0046765 A1* | 2/2013 | Vemula | G06F 16/951 |
| | | | 707/E17.075 |
| 2013/0073998 A1* | 3/2013 | Migos | G06F 40/166 |
| | | | 715/776 |
| 2013/0074133 A1* | 3/2013 | Hwang | G06F 16/48 |
| | | | 725/93 |
| 2013/0104072 A1* | 4/2013 | Havard | G09G 5/377 |
| | | | 715/764 |
| 2013/0124988 A1* | 5/2013 | Lettau | G06F 40/103 |
| | | | 715/277 |
| 2013/0151954 A1* | 6/2013 | Ierullo | G06F 40/10 |
| | | | 715/254 |
| 2013/0290838 A1* | 10/2013 | Hoareau | G06F 16/248 |
| | | | 715/255 |
| 2014/0115436 A1* | 4/2014 | Beaver | G06F 40/197 |
| | | | 715/229 |
| 2014/0122990 A1 | 5/2014 | Puppin | |
| 2014/0143224 A1* | 5/2014 | Allawi | G06F 16/3334 |
| | | | 707/706 |
| 2014/0164360 A1* | 6/2014 | Nickolov | G06F 16/332 |
| | | | 707/769 |
| 2014/0164366 A1 | 6/2014 | Narayanan et al. | |
| 2014/0188831 A1* | 7/2014 | Benchenaa | G06F 16/904 |
| | | | 707/706 |
| 2014/0195961 A1* | 7/2014 | Shoemaker | G06F 15/0291 |
| | | | 715/776 |
| 2014/0250355 A1* | 9/2014 | Jimison | G06F 3/0483 |
| | | | 715/202 |
| 2015/0006503 A1* | 1/2015 | Cary | G06F 16/951 |
| | | | 707/710 |
| 2015/0026176 A1* | 1/2015 | Bullock | G06F 3/0483 |
| | | | 707/736 |
| 2015/0046783 A1* | 2/2015 | O'Donoghue | G06F 40/169 |
| | | | 715/205 |
| 2015/0066980 A1* | 3/2015 | Kim | G06F 3/013 |
| | | | 707/769 |
| 2015/0089368 A1* | 3/2015 | Lester | G06F 16/61 |
| | | | 715/716 |
| 2015/0100562 A1* | 4/2015 | Kohlmeier | G06F 3/04842 |
| | | | 707/706 |
| 2015/0154308 A1* | 6/2015 | Hagg | G06F 16/35 |
| | | | 707/722 |
| 2015/0379132 A1* | 12/2015 | Cho | G06F 16/9535 |
| | | | 707/722 |
| 2016/0034575 A1* | 2/2016 | Landau | G06F 3/04842 |
| | | | 707/730 |
| 2016/0092583 A1* | 3/2016 | Patel | G06Q 30/0635 |
| | | | 705/26.81 |
| 2016/0162173 A1* | 6/2016 | Chandra | G06F 3/04847 |
| | | | 715/747 |
| 2017/0060365 A1* | 3/2017 | VanBlon | G06F 40/30 |
| 2017/0186338 A1* | 6/2017 | Treves | G09B 5/06 |
| 2018/0060743 A1* | 3/2018 | Chak | G06F 40/279 |
| 2019/0146742 A1* | 5/2019 | Li | G06F 3/0483 |
| | | | 345/11 |
| 2019/0196675 A1* | 6/2019 | German | G06F 3/165 |

FOREIGN PATENT DOCUMENTS

| | | |
|---|---|---|
| JP | 2012038333 A | 2/2012 |
| JP | 2014191417 A | 10/2014 |
| JP | 2015158817 A | 9/2015 |

* cited by examiner

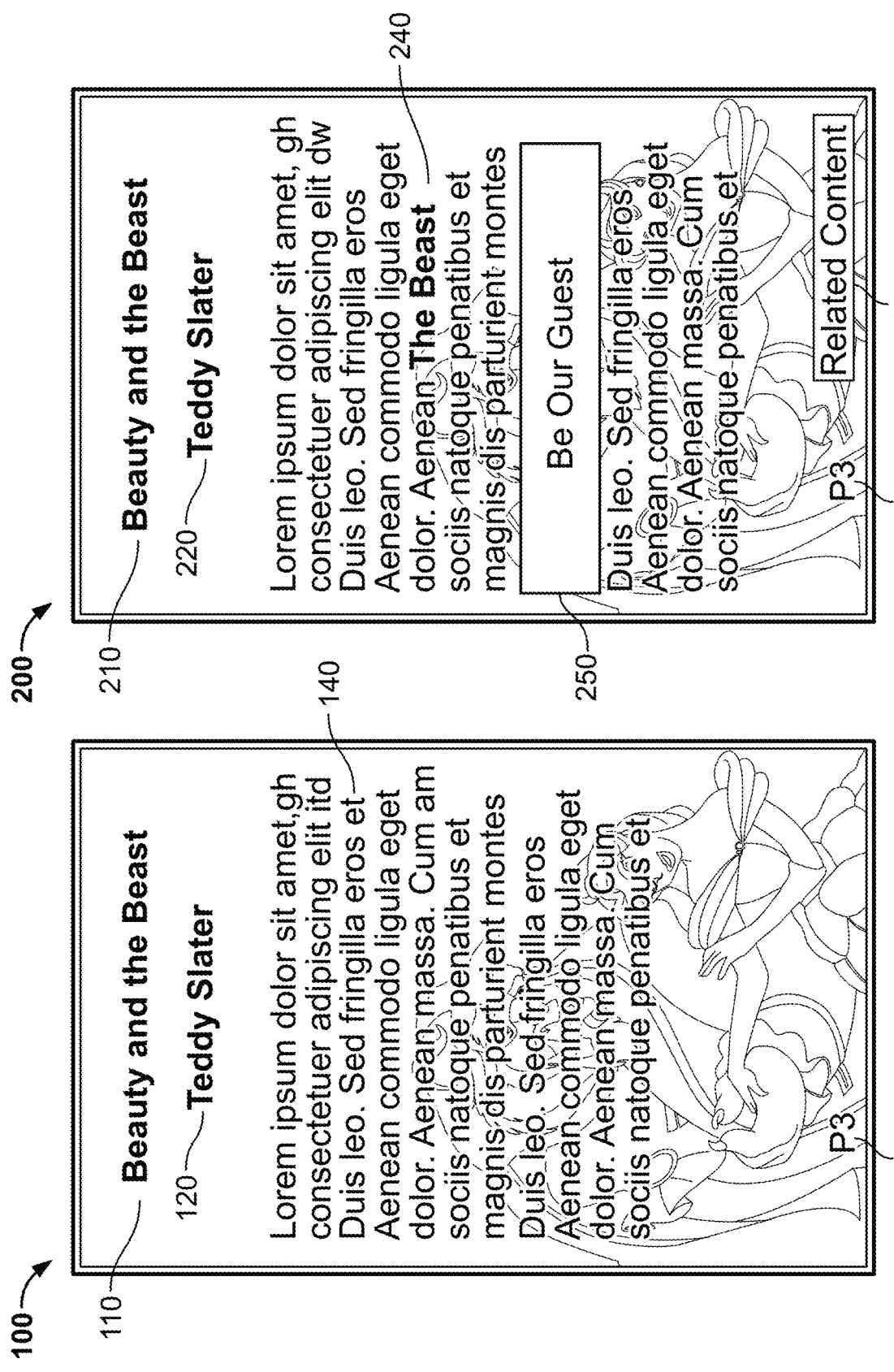

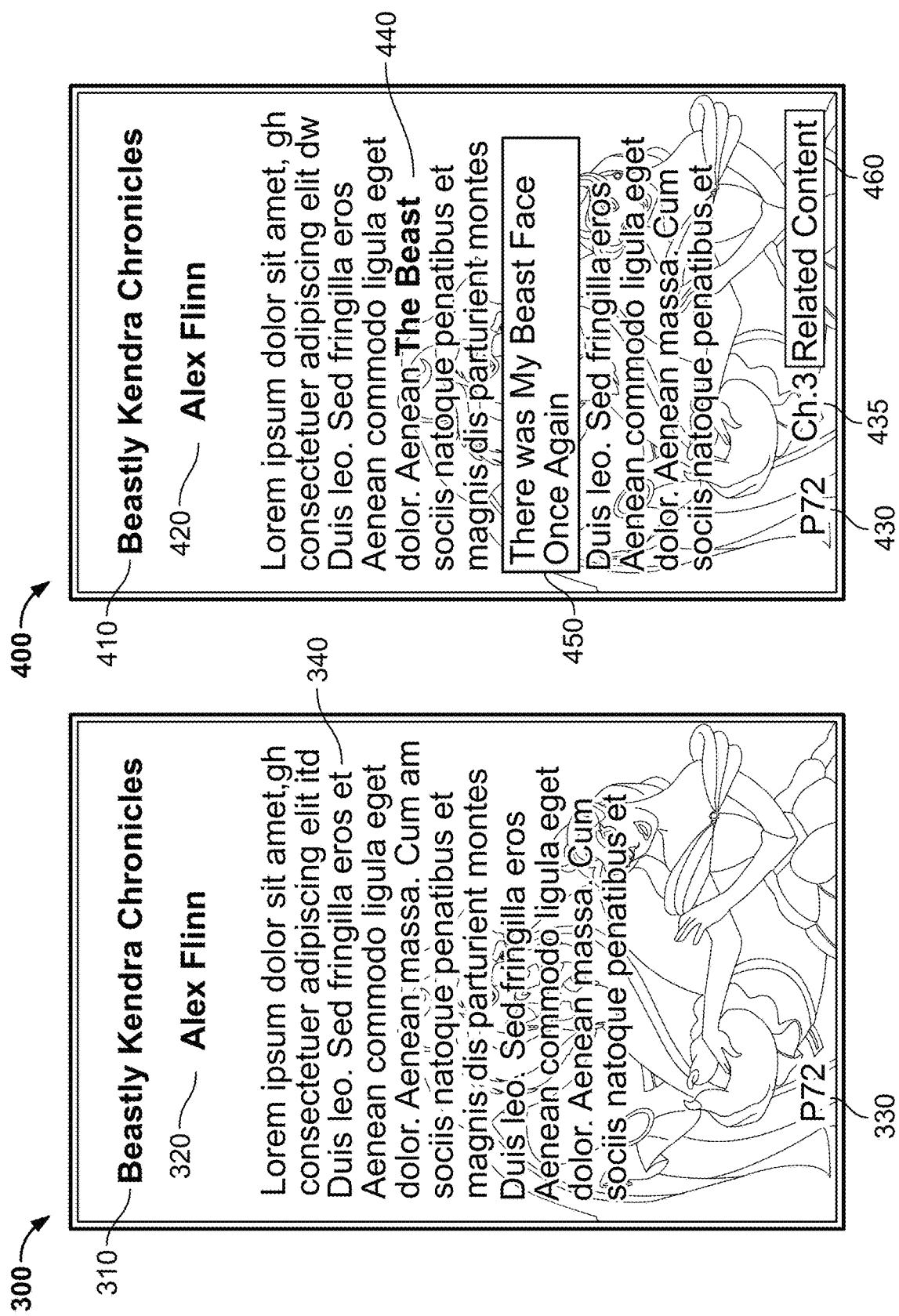

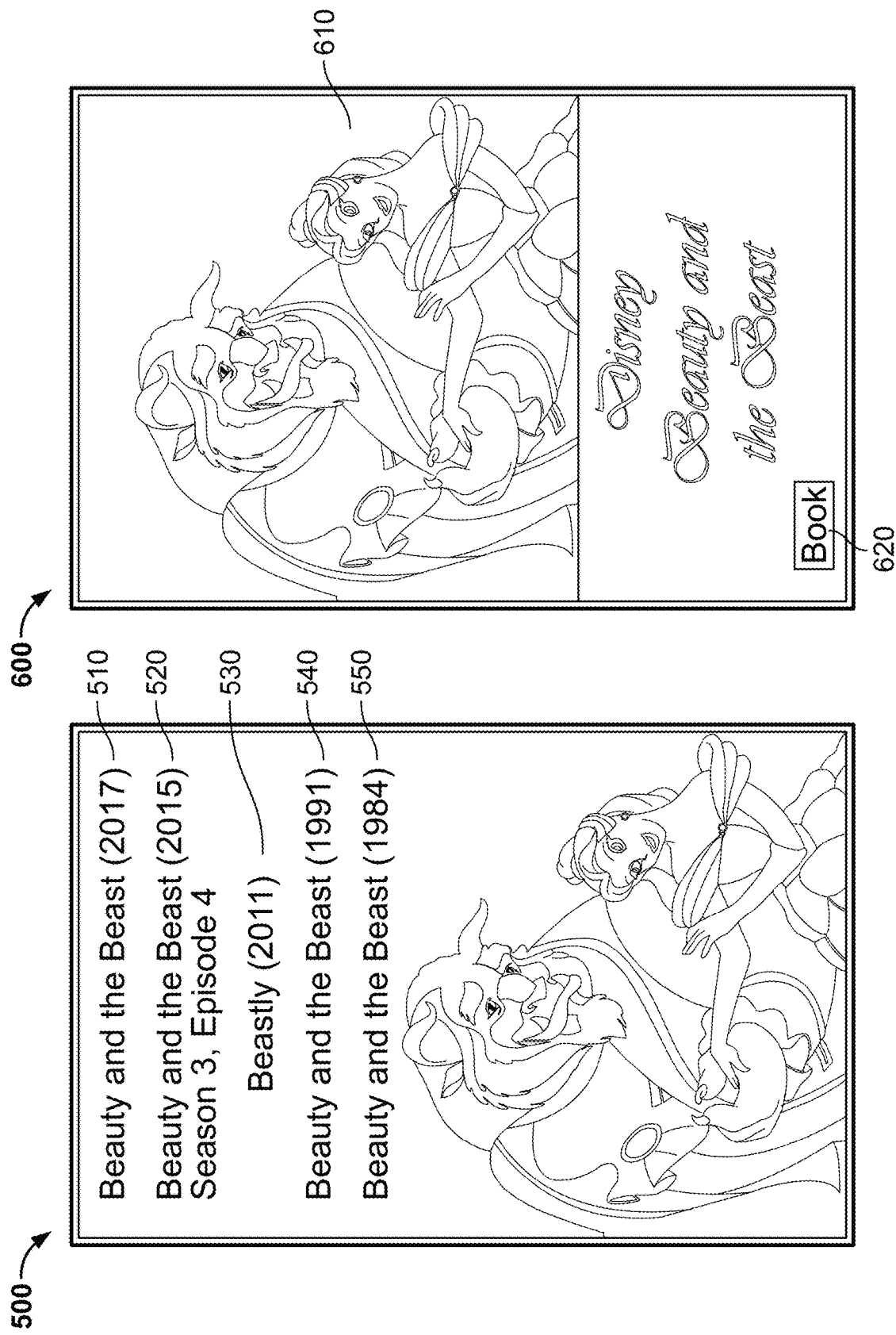

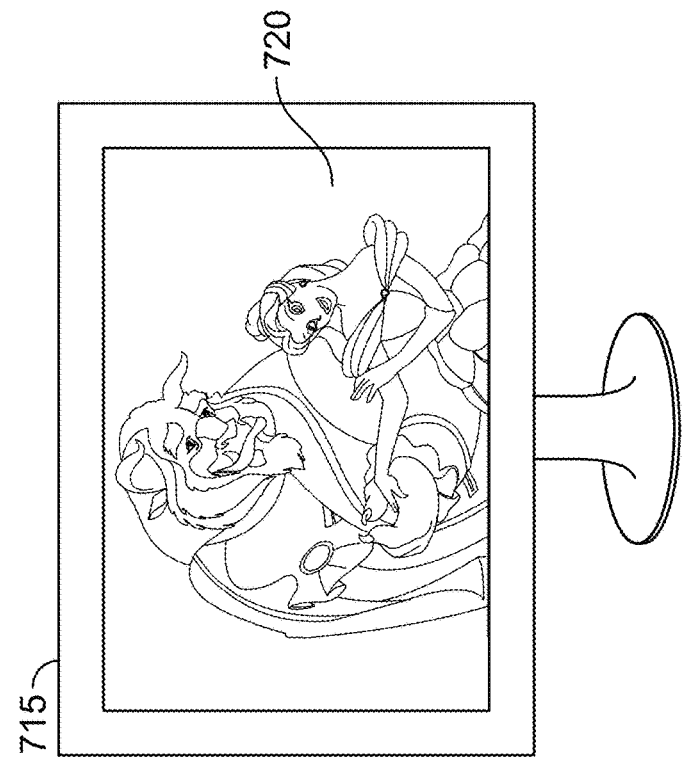
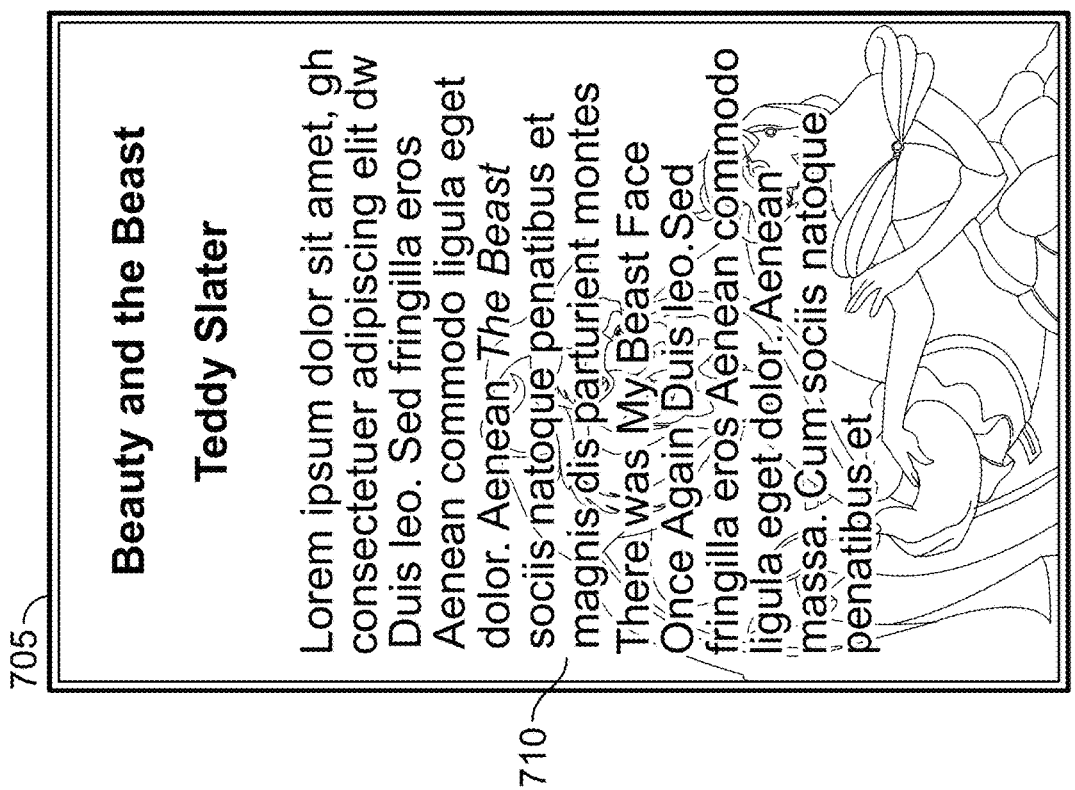
FIG. 7

1700

1710 — Receive at the Media Guidance Application Control Circuitry a Selected Portion of Text in an Ebook 1715 — Parse at the Media Guidance Application Control Circuitry the Portion of Text to Determine a Keyword in the Portion of Text 1720 — Generate with the Media Guidance Application Control Circuitry a Query for Supplemental Content Based on the Keyword 1725 — Transmit with the Media Guidance Application Control Circuitry the Query to a Remote Database 1730 — Receive at the Media Guidance Application Control Circuitry a Plurality of Search Results from the Remote Database Based on the Keyword 1735 — Retrieve by the Media Guidance Application Control Circuitry a Manifest File for the Ebook, Wherein the Manifest File Indicates a Title of the Ebook and a Chapter of the Ebook from which the Portion of Text was Selected 1740 — Select by the Media Guidance Application Control Circuitry the title, Based on the Manifest File, as a First Criterion 1745 — Select by the Media Guidance Application Control Circuitry the Chapter, Based on the Manifest File, as a Second Criterion 1750 — Filter Using the Media Guidance Application Control Circuitry the Plurality of Search Results Based on the First Criterion and the Second Criterion (A)

FIG. 17

SYSTEMS AND METHODS FOR DISPLAYING SUPPLEMENTAL CONTENT FOR AN ELECTRONIC BOOK

CROSS-REFERENCE TO RELATED APPLICATION

This application is a continuation of U.S. patent application Ser. No. 15/818,379, filed Nov. 20, 2017, which is hereby incorporated by reference herein its entirety.

BACKGROUND

There are many types of devices that are capable of displaying electronic book data for a reader. Some of those devices are also capable of displaying other types of media data. In some electronic book devices, a reader may be able to interact with the book content in limited ways. For example, a reader may be able to search a dictionary for a definition of a term in the book. In another example, a reader can search for terms in a text, and highlight and comment on text. Such interactions are limited to the content of the text in the electronic book. There is no mechanism for linking electronic book text with other related content. However, a reader may wish to find additional content related to the text to enhance the reader's reading experience. If a user wishes to find other content related to the electronic book, the user would need to perform a search for the content and the search results may be voluminous or irrelevant because it can be difficult to find content that is interesting to the user or that is relevant to the electronic book, in particular, a portion of the book that the reader is reading.

SUMMARY

Accordingly, systems and methods are described for providing supplemental content to accompany an electronic book ("ebook"). An ebook user may read a book on an electronic device. There are many ways to view ebooks. For example, a dedicated ebook reader, such as a Kindle, Nook, Fire tablet can be used to read an ebook. There is also ebook software, such as iBooks, Kindle, OverDrive, CloudLibrary, etc., that can be used on a tablet or portable device to read ebooks. When a reader is reading an ebook, the reader may wish to obtain content that is related to the ebook. For example, a reader may wish to obtain notes related to the book, character information, or other details. Some readers may wish to view other related content, such as a movie adaptation, book reviews from friends, video clips about the text, or other content. Such related content may be considered supplemental content for the ebook. The supplemental content may be viewed on the same device the reader is using, or shared to another device. For example, a reader on a tablet may be sitting in their living room and may wish to activate a related movie or television show on a television screen. In another example, a reader on a tablet may read an ebook and wish to share the experience with a family member or friend and can search for media related to the ebook to display on another device for the other person. To find such supplemental content, the user may interact with the text of the ebook to obtain the supplemental content. In some scenarios, interaction with the text of the ebook may create a search query using a media guidance application to search for supplemental content. In some examples, selectable options for supplemental content may be included in the text of the ebook display, or in the display page for the ebook. In another example, the supplemental content may also be identified by a media guidance application using information in an ebook file. These examples may be combined in an ebook text display screen to present different ways of accessing content that is related to the ebook in the same screen.

In an example, a user may select a portion of the text in an ebook that is displayed on a user device. The selection of the portion of the text may be input using a touchscreen on the display device, or by using another user input technique, such as using a mouse, ball, roller, etc. The selected portion may be received by the user device on which the ebook is displayed, or alternatively, be received by a user device that is remote to the ebook tablet. Such input may be received by the user device by a communication from the ebook tablet, such as by a home network (e.g., LAN), or via a data or cellular connection, or via the Internet. The selected portion of the text may be identified or highlighted for the user by generating an overlay class for the portion of the text so that it is visible to the user or reader.

The user device may parse the received portion of the text to determine a keyword in the portion of text. The keyword may be one or more actual terms that are included in the portion of text. Generally speaking, any term in the selected text may be a keyword. Some terms may be determined to have a greater relevance as a keyword in a search. Such terms may be, for example, nouns over adjectives and verbs. Such terms may also be identified by comparing the terms in the selected text to a summary, notes, or metadata about the book and which may be in the ebook manifest file. For example, some books may have tag lines that are associated with a reference source and which may also have some associated media items. In some scenarios, the selected text may be identified in the display in a distinctive manner so that the reader can tell that there is supplemental content associated with the text. When such text is selected, a media guidance application running on the ebook device may identify the related supplemental content to be delivered to the device. In some examples, the media guidance application can retrieve the associations between the text in the ebook and the supplemental content by checking the metadata or manifest file for the ebook. In other examples, the media guidance application may retrieve the supplemental content information from a media database where ebook and supplemental content associations may be stored. In another example, the media guidance application may check both sources and choose the best or most relevant supplement content item for display to the reader based, for example, on the reader's user profile, a device history, media access availability, popularity of the supplemental content, the strength of the relevance of the supplemental content, or other basis.

Many ebook files are stored in an EPUB file format which is a technical standard file format for digital publications. Other file formats are also used for ebooks, for example PDF. In general, the EPUB file format includes details about the ebook which may be in a manifest file for the ebook. The manifest file for the book may be retrieved at the user device by the media guidance application and may indicate, among other information, a title of the ebook, and a chapter of the ebook from which the portion of text was selected. An automatic selection may be performed by the media guidance application of the title obtained from the manifest file and the title may be made a first criterion. The chapter of the ebook may be obtained from the manifest file and automatically selected as a second criterion. In some scenarios, the media guidance application may search a database of stored ebook and related content links, and then filter the relevant results using the manifest details for the ebook.

A query for supplemental content related to the ebook portion may be generated using these criteria (i.e., the first criterion—title, and the second criterion—chapter) and the keyword that was obtained from the selected portion of the text. The query may be transmitted from the user device to a remote database, such as a media database, to search for a supplemental content item matching the query (i.e., the keyword, the first criterion, and the second criterion). A matching supplemental content item may then be transmitted to the media guidance application and displayed at the user device by the media guidance application. In an example, an ebook reader may read a version of Beauty and the Beast. There are many different book versions and adaptations of Beauty and the Beast. There are also television series, movies, cartoons, animated movies, songs, music videos and other media that is inspired by the original story. If a reader of Beauty in the Beast is interested in finding related content that is relevant to the book, the reader may select a portion of the text of the Beauty and the Beast ebook to generate a search. Such search could also include criteria from the ebook manifest file including the title of the book and a chapter of the book. Simply searching for a keyword from the text could lead to a number of random results. For example, in Beauty and the Beast, a simple search of a tagline "be our guest" may lead to results that match "guest". Such results would be irrelevant to the reader. For a reader who may be reading Beauty and the Beast and when seeing the phrase "be our guest", may recall the song from the movie, and may wish to view a music video or a movie clip including the song.

Adding the book title to the search will help contextualize the search. In addition, for media that is episodic, or which has multiple parts, using the chapter or location information can map out a point in the progression of the story to find more relevant results. In some examples, since the tagline "be our guest" is known in reviews and commentary on Beauty and the Beast media, the media guidance application may identify supplemental content for this tagline and store it in an ebook database that can serve information to the ebook reader so that uses of this tagline in the ebook can be displayed in a manner indicating that there is supplemental content. When such text is selected, the selection may be received by the media guidance application, which will then consult the ebook database, or the ebook metadata file to identify and retrieve the related supplemental content. Additional criteria for the query may also be included in the search. For example, a third criterion may be identified in the manifest file for the ebook that is related to the selected portion of the text, including a page number, a line number, a paragraph number, a scene, an electronic bookmark, a movie, a movie version. Additional criteria and combinations of criterion can also be used to shape a query for supplemental content. For searches that are performed automatically by the media guidance application, the manifest file criteria can be used to focus a choice of a particular supplemental content item that is most relevant to the portion of the text in the ebook.

User preference information can also be used to shape a search and filter results. For example, for a reader with a media guidance user profile that includes parodies, cartoons and comedies, when such reader selects a portion of text from an ebook, the preference profile may alter the results. For example, for a reader of Beauty and the Beast, when selecting the tagline "be our guest," the reader may see a result listing that includes a Simpsons episode including a parody song by Mr. Burns "See My Vest".

In some scenarios, supplemental content that is identified in the search may be shared with a second user device. For example, a reader may read an ebook on a tablet or portable device and may wish to view some related content to the book, such as a movie adaptation of the book. The reader may seek to view that movie on a larger screen, such as a television, or may wish to share the movie with a second device, perhaps the reader's own device, or a friend's or family member's device. The supplemental content that is displayed on the user's device may be configured to be displayed with a selectable button that allows the user to share the supplemental content with another device. When the button is selected by the user, the media guidance application will receive the selection and cause the supplemental content to be displayed on the second device. Before the supplemental content is displayed on the second device, the media guidance application may perform an optional determination to ensure that the supplemental content item can be displayed on the second device. For example, the second device may have certain media subscription limitations, age and content controls, or other restrictions for displaying the supplemental content. In this case, the user may be prompted to confirm accessibility or suitability of the supplemental content.

In some scenarios, an ebook may be displayed in a manner that makes it clear that there is related supplemental content. For example, a sentence, or a phrase in an ebook may be a tagline in a movie adaptation of the book. For example, in Beauty and the Beast, a tagline "be our guest" may be displayed in a different way in the ebook. In this example, the sentence with the tagline may be highlighted in a manner to show that it has associated supplemental content. Each instance of the highlighted phrase or term may be shown in different manners which may indicate a type or source of supplemental content. For example, supplemental content that is a video clip may be shown with related text displayed in one way, and supplemental content that is a movie may be depicted by have related text shown in another way. Other types parody or social commentary content may be depicted in other ways. The tagline "be our guest" may be associated in a media database with a Beauty and the Beast movie, a music video for the song "Be our Guest", a cartoon showing the song "Be our Guest", an episode of one of the Beauty and the Beast television series related to the scene, or other relevant media. The tagline in the ebook may be associated with different items in the media database depending on the location of the tagline in the ebook text. For example, an earlier use of "be our guest" may be associated with one portion of a movie, or a video clip, while a later use of "be our guest" may be associated with a reprise video, or a television episode, or a scene in the live action version of Beauty and the Beast, etc. Metadata for the ebook file may include references between the ebook text and supplemental content, or the ebook text and an ebook database source for finding supplemental content links. Such database may be updated by the media guidance application to provide the best and most relevant supplemental content items.

The sentence may be visually highlighted using an overlay class for the sentence to show that there is related supplemental content. In another example, a button or selectable indicator may be included in the ebook display that may be selected to obtain supplemental content for the ebook that is related to the portion of the ebook being displayed to the reader. As the reader progresses through the ebook, such supplemental content button may lead to different supplemental content items depending on the page the reader is viewing or reading. For example, a portion of text early on in Beauty and the Beast may be relevant to a number of adaptations of Beauty and the Beast—movie, television, live action, music videos, however, a later portion of the text may have different associated media items because the movie or television episodes may have omitted references to certain parts of a Beauty and the Beast book. Details about the relationships between the progress in the book may be found in a manifest file for the ebook, and used to correlate associated media items in remote media databases.

When the query is created to search for supplemental content, the criterion obtained from the manifest file may be important in that it may relate to progress in an ebook. This can be relevant for a book that is part of a series of books and/or which may be adapted into multiple movies, or episodes of a television series. Thus, when chapter information is obtained from the manifest file for the selected portion of the text, it may relate to the last page the user has viewed in the user's progression through the book.

When supplemental content is displayed at the user device, the user may wish to easily return to the ebook. When the user selects the portion of text to initiate a search for supplemental content, the media guidance application may capture the location of the text portion in the ebook file and create a bookmark to the page and store the bookmark in association with the user for the ebook file. The ebook bookmark may be stored in cache on the ebook reading device and/or in a database for the user. Such database may include user reading history information and have access to user profile information. To facilitate the user's return to the ebook, the supplemental content may be displayed with a selectable option to return to the ebook. In particular, to the point in the ebook where the user selected the text portion to find the supplemental content. The ebook bookmark may be used to identify this location. Or, in some scenarios, the user may wish to return to the last point in the book that the reader has read.

In another example, supplemental content may be found for an ebook using a search query that is then filtered using information from the ebook file, in particular, a manifest file for the ebook. In an embodiment, a first user input selecting a portion of text in an ebook is received at a user device. The user may select the portion of the text using any suitable technique, such as by touching the text portion on a touch screen tablet, or my using a mouse, roller, keyboard or other input device on a reading device. In some scenarios, the portion of the text that is selected by the user may be identified using highlighting in the ebook display using, for example, an EPUB overlay class for the portion of text. The selected portion of text may be parsed at the user device using a media guidance application to determine a keyword in the text portion. The keyword or keywords may be determined using media guidance application control circuitry in the user device and analyzing the terms in the selected text portion. For example, some short words, such as text particles may not be important words to include in a search, and terms that are included in metadata or the manifest file for the ebook may be given a higher priority for use as a keyword. Instead, some nouns, verbs or other terms may be more suitable for a search.

A query may be generated at the user device using a media guidance application to search for supplemental content based on the determined keyword. The keyword in the query may be transmitted using the media guidance application over a network to a remote database to search for supplemental content. The remote database may be any media database and the search may be performed concurrently at more than one media database to obtain search results. Search results matching the query may be received at the user device from the remote database.

The search results may be filtered by the media guidance application to improve the quality of the results and also reduce the number of search results using information from the ebook file. The user device may retrieve the manifest file for the ebook. The manifest file includes information about the ebook including, for example, the title and chapter for the portion of the text that was selected to generate the search query. The user device can automatically select those pieces of information, i.e., the title and the chapter from the manifest file as criterion for filtering the search results. The user device can filter the search results based on these criteria. The filter can, for example, remove search results that are not related to the title and/or chapter, leaving search results that have some match or connection to the title and/or chapter. After filtering the search results based on the criteria, the media guidance application may generate a display of search results that match the criteria. Additional types of criteria may also be obtained from the manifest file by the media guidance application and which may also be used to filter search results. Some of those criteria may be a page number, a line number, a paragraph number, a scene, an electronic bookmark, or a movie version for the ebook. Automatically selecting the criterion using the manifest file may be performed using the location of the selected text. In some scenarios, the criterion may be selected using information about the location of the reader. For example, a chapter criterion may be selected using a page based on the user's progress, such as a last accessed page by the reader.

In an example, a page or chapter in the manifest file may include percentage information for the progression to completion for the ebook. The page or chapter in the manifest file may also be associated with metadata including chapter summary information and keywords which may be used to augment a search for relevant supplemental content. Such metadata information in a chapter summary may also be used to compare to metadata for media items in a media database. For example, metadata for an episode of the television series Beauty and the Beast can include closed caption text which can be searched to find closed caption terms that match the keywords or selected text portions. In another example, metadata for a movie can include taglines and keywords which can be matched to the search query terms.

In some scenarios, selection of a portion of the ebook text in the display screen may be received by the media guidance application and supplemental content will be generated for display automatically on the user's device. In other scenarios, selection of a portion of the ebook text may be received by the media guidance application, and search results for more than one related supplemental content items may be displayed for the user to select.

A user may select one of the search results in the display, and the media guidance application will generate a display of supplement content item that corresponds to the selected search result. For example, a user may select a movie or television episode from the list of search results and the media guidance application will generate a display of the selected media item by requesting the selected media item from a media source.

In some scenarios, the supplemental content may be displayed with an option to share the content with a second user device. Such option may be included in the display of the supplemental content and/or included along with the search results. Such option may also be provided when a user initiates a query or request for supplemental content. If a user selects the option for sharing the supplemental content with another user device, the supplemental content may then be shared and displayed on the other user device by the media guidance application. Prior to sharing the supplemental content to another device, the media guidance application may check that the supplemental content may be displayed on the other device. For example, a second device may be a child's, or have some content access restrictions. In such cases, the media guidance application may ensure that the supplemental content is suitable and meets the requirements or controls set for the second device. In another situation, there may be subscription requirements to access the supplemental content. If the second device is determined to not have access to certain media sources, the supplemental content, if subscriber restricted, may not be shown on the second device. Alternatively, the user may be shown an option to remediate the restrictions by, for example, accessing the subscriber limited sources, waiving the access restrictions, etc.

In some examples, availability of supplemental content may be shown in the ebook display. In such example, sentences in an ebook that relate to supplemental content may be highlighted or shown in a visible manner. The highlight may be effected using an EPUB overlay class for the sentence serving as an indicator in the overlay class of the supplemental content. In another example, ebook text may be shown with a selectable indicator within the ebook display which, when selected, causes supplemental content for the ebook to be displayed on the user device.

Supplemental content may be displayed on the reading device the user is using to view the ebook. Since the reader may wish to easily return to the ebook after viewing the supplemental content, the supplemental content display may include a selectable option to return to the ebook text. In some scenarios, the selectable option will allow the reader to return to the selected portion of the text used to generate the search query. In other scenarios, the selectable option, when selected, will cause the reader to return to the last page the reader accessed in the ebook.

In some scenarios, supplemental content may be searched and identified when a user accesses an ebook file. For example, the user may access the ebook file by purchasing the ebook from an ebook store, borrowing it from a friend or library, or other source. The ebook file for the ebook may be delivered to a suitable device for the user. A media guidance application may run on the user device and have access to the ebook file, as well as user preference information. In some examples, the media guidance application may perform a search for supplemental content for the ebook when the file is delivered, accessed or otherwise associated with the user. For example, if a user is tagged in social media for a book, such tagging may be detected by the media guidance application and such ebook association may cause the media guidance to perform a search for supplemental content for the user. In another example, the media guidance application may search for supplemental content for the user when the user places an ebook on hold in the user's library account. In another example, the media guidance application may perform a search for supplemental content for the ebook when the user purchases the ebook or downloads it to a device, or other action connecting an ebook to a user, that is detectable by the media guidance application.

When the media guidance application performs a supplemental content search for an ebook, the media guidance application may form search queries for the supplemental content using keywords from the ebook file. For example, the media guidance application may use keywords from a chapter summary or notes in the ebook file. In some examples, the keywords may be obtained from metadata associated with the ebook in the ebook file. In other examples, query terms can also include keywords or criteria from a manifest file for the ebook. In some examples, keywords may be obtained from a third party book related database, such as a database of book reviews, book blogs, book seller information, or other sources. The media guidance application may search media sources for supplemental content related to the ebook. Links to the supplemental content items identified in the search may be stored in association with relevant portions of the book text in the ebook file, for example, in metadata for the ebook. When the ebook is rendered for display in the device, the control circuitry for the ebook may retrieve metadata information for the ebook and display the ebook text in a manner that makes clear that portions of the ebook text have related supplemental content that can be accessed by the reader. For example, a text portion in the book may include a tag line that can be displayed in a distinctive manner so that the user can tell that there is associated content. In a book Beauty and the Beast, for example, the tagline "be our guest" may be displayed in a distinctive format so that the user may know that it can be selected to obtain supplemental content, such as a music video of a rendition of the song from the movie adaptation of Beauty and the Beast.

Generally speaking, the media guidance application may update searches for supplemental content on a periodic basis so that the links shown in the ebook text are timely and relevant. In some scenarios, the media guidance application will use user preference information to identify suitable supplemental content for a user. Thus, an ebook file stored on a device that is accessed by more than one user, for example, a family tablet, may be displayed with different highlighted portions or links to different types of related supplemental content based on the user profile of the reader and content access restrictions for the reader.

In some scenarios, searches for supplemental content may be performed by the media guidance application for any ebook file, without having a particular focus on a user to build a database connecting text in the ebook file to supplemental content. Although it may be somewhat wasteful of processing and storage capacity to identify these supplemental content links for ebooks without limiting the focus to a particular book or particular user, this information can be accessed by the media guidance application to provide supplemental content links to the user quickly. Such a database can be updated periodically with links to the supplemental content. When a user accesses an ebook file, the media guidance application can use the database information for the ebook to add links in the display of the ebook file. Ideally, in this scenario, the media guidance application would refine choices of the supplemental content links based on the reader's user profile in the links to supplemental content shown in the reader's display of the ebook.

In some examples, the text of an ebook may be displayed with more than one way for obtaining supplemental content. For example, the text of the ebook may include a selectable option on a page that can lead to supplemental content that is generally associated with the displayed page. In the same display screen, the ebook text may have certain words or images in the text displayed in a distinctive manner that connotes having associated supplemental content. When such distinctive words or images are selected, the media guidance application may retrieve supplemental content associated with the words or images. In the same display screen, terms in the text may be selected by the reader and used to form the basis of a query for supplemental content. Selection of the text terms may cause the media guidance application to identify keywords in the selected text, and also identify location and book title information from a manifest file for the ebook, and form a search query for supplemental content. Searching for content in this manner can be time consuming for the reader, however, the reader may have a particular focus in mind for a search related to the selected terms.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 1-4 show illustrative examples of a display screen for an ebook in accordance with some embodiments of the disclosure;

FIG. 5 shows an illustrative example of search results in a display screen in accordance with some embodiments of the disclosure;

FIG. 6 shows an illustrative example of a display of supplemental content in accordance with some embodiments of the disclosure;

FIG. 7 shows an illustrative example of a display screen for an ebook and a second device showing supplemental content in accordance with some embodiments of the disclosure;

DETAILED DESCRIPTION

Figure 8:
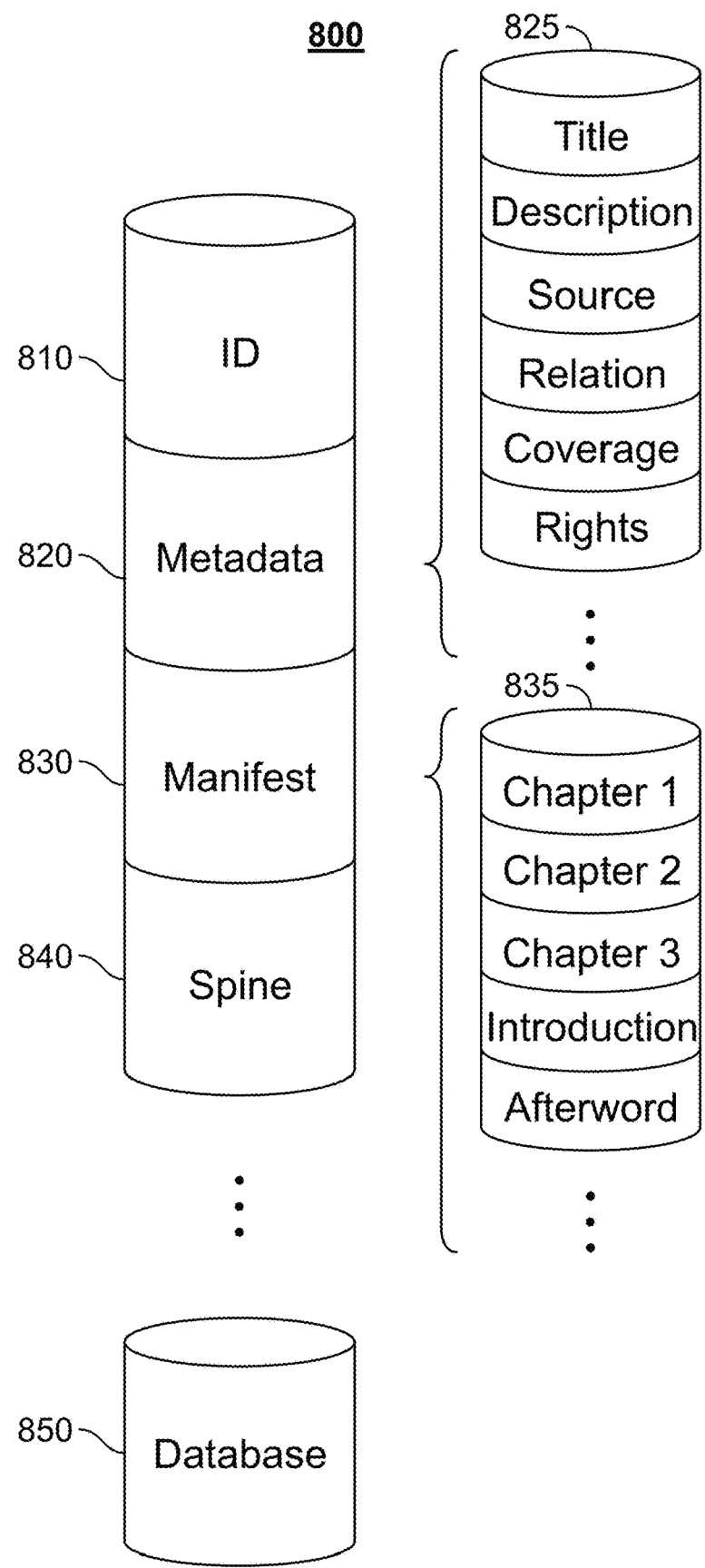
FIG. 8 is a block diagram of an ebook data file in accordance with some embodiments of the disclosure.

Systems and methods are described for searching for supplemental content for an electronic book or ebook. Reading books on electronic devices is now commonplace. Ebook readers are now often indistinguishable from electronic tablets in their ability to run software applications and showing different types of media. At one time, reading a book was simply that. But now, given the media creep into electronic devices, readers can easily look up terms in a dictionary by clicking on the terms in the ebook text and find book reviews about the book. A reader may wish to enhance their reading experience by accessing related or supplemental content for the ebook. For example, a reader may wish to watch a movie adaptation of the ebook, view a clip of a movie adaptation, view a music video for a song having a tagline that appears in an ebook. A reader may also wish to share the ebook experience by, for example, sharing the movie adaptation to a friend or family member's screen. In another example, a reader may wish to hear a musical score for the movie adaptation to surround the reader with an audio experience for the book.

A conventional ebook display screen is shown in FIG. 1. As shown, ebook device 100 includes an ebook display for a picture book of Beauty and the Beast that shows a title 110, author 120, page number 130 and text 140 for the ebook. The arrangement in the screen is illustrative only and some of the elements shown may be omitted, so that only the text 140 and title 110 are shown, or some combination of book elements. In addition, the book may include background images and pictures for the book which can relate to the text 140.

Another ebook display screen 200 is shown in FIG. 2 for the same book as shown in FIG. 1. For example, title 210, author 220, and page 230 information are shown in the ebook display 200. Text 240 for the ebook is shown with some additional enhancements. For example, a phrase "The Beast" is shown in bold. A box 250 highlights a phrase—"be our guest" in the text 240 that has been selected by a reader. There is also shown a selectable option 260 for related content. The phrase "The Beast" is shown in bold to signify its importance and also to depict a source or type of associated related content that has been identified by the media guidance application. Highlighted phrases or terms in the ebook can be depicted in a number of ways so that the user can see that different types of media may be associated with the phrase. For example, different colors or text styles may be used to signify that there may be a related movie, television show, video clip, news article, blog commentary, social network channels, user generated video commentary, etc. The highlighted phrases can be significant for different reasons. In some examples, the highlighted phrase may indicate that it has some related content and that if the phrase is selected, some additional content about the phrase can be accessed. The words in the ebook file that are shown with a highlight can be selected for display in a suitable manner by the media guidance application using information about the text from the ebook manifest file, and using metadata for the ebook. For example, a media guidance application may retrieve details about supplemental content for the ebook from a media database and identify terms to highlight in the ebook by matching supplemental content items with ebook text information from the manifest file for the ebook.

The supplemental content that is associated with the highlighted terms in the ebook text display can be any type of media content, such as a movie, an image or information about the character, definitions or notes about the phrase, or other information. The highlighted phrase 250 can also be indicative of significance of the phrase within the highlight. The highlight may be created, for example, using an overlay class for an EPUB file.

The highlighted phrase 250 may also be used to signify text that has been highlighted by a reader to generate a query for supplemental content. The media guidance application may receive a user selection of the portion of the text 250 using a user input technique such as a touch screen or keyboard. Selection of the portion 250 may be received by the media guidance application and used to form the basis of a query to search for content related to the ebook, in particular the selected portion of the ebook.

The selectable option 260 may be another way to access related content for the ebook. In response to receiving a user selection of option 260 from certain pages may instruct the media guidance application to create a query for supplemental content that includes details about the location of the option 260 within the ebook display. For example, in a book that is adapted to a series of television episodes, a manifest file for the ebook text may include a page number or chapter number which may indicate the readers progress in the book which may be related on a particular television episode in the series of television episodes. A particular episode may be identified as being relevant supplemental content in several ways. For example, metadata for episodes of a series may be searched to find description information that matches the keyword. In another example, closed caption data for an episode of a series may be used to find an instance of use of the keyword. In another example, a percentage of ebook text completed, which may be obtained from a manifest file, may roughly correlate to a progression in a series of episodes. In yet another example, user generated commentary associated with a series of television episodes may be searched to find matching terms to the keyword and chapter progression. Selecting option 260 from one page of the book may lead to one of the episodes, while selecting option 260 from another page of the book may lead to another of the episodes of the television series. In another example, selecting option 260 may lead to a display of more than one supplemental content item. In some examples, the selectable option 260 may be linked to particular supplemental content identified by the media guidance application as being relevant to the ebook page being displayed to the reader. The supplemental content links may be stored by the media guidance application in the metadata for the ebook file or in a remote ebook database. Such links may be updated periodically by the media guidance application.

FIGS. 3 and 4 are also illustrative depictions of an ebook display. In FIG. 3, an ebook device 300 shows a display of the Beastly Kendra Chronicles, which is a story based on Beauty and the Beast, and the display includes a book title 310, author 320, page number 330 and ebook text 340. The same ebook text is shown in FIG. 4 with additional features for searching for supplemental content related to the ebook text. As shown, in FIG. 4, the ebook display 400 includes title 410, author 420, page number 430, chapter 435, and ebook text 440. A highlighted portion 450 of the text 440 is shown for text in the ebook that has been selected by a reader. Selection of the portion 450 may be received by media guidance application at the reader or electronic device and used to form the basis of a query to search for content related to the ebook, in particular related to the selected portion of the ebook. Supplemental content related to the ebook may also be obtained by selecting an option 460 and by selecting certain text in the ebook display shown in a distinctive manner, e.g., by selecting "The Beast" which is highlighted to show that it has some related content. "The Beast" may be highlighted in a distinctive manner to indicate that it has supplemental content from a certain source or of a particular type, such as a movie or video clip, or a social network channel, or user generated commentary, etc. Selecting option 460 from one page of the book, or a certain chapter of the book may lead to different related content depending on the location within the ebook that the option 460 is selected. Information about progression through the text may be discerned from the manifest file for the ebook file and used to find suitable supplemental content.

The selected portion of the text 250 (FIG. 2) and 450 (FIG. 4) may include one more terms from an ebook. The selected terms may be parsed by the media guidance application running on the ebook reader to find one or more keywords to use in a search query for supplemental content. For example, the selected portion "there was my beast face once again" from 450 FIG. 4 may yield keywords for "beast face", which are nouns, while the particle "my" may be dropped from the search query because it is a particle of speech that may have too many matches in a search. Similarly, the terms "once" and "again" are adverbs and may also be dropped from a search query because they may not yield useful search results. Such a query may be performed by the media guidance application upon receipt of the selected terms from the user, or when the media guidance application parses the ebook text overall to identify links between the ebook and supplemental content.

When a query for supplemental content is created using the media guidance application by, for example, receiving a selection of an option for related content using buttons 260 (FIG. 2) or 460 (FIG. 4), or by selection of portions of text 250 or 450 (FIGS. 2 and 4, respectively), or by selection of text portions designated as having related content, a remote database of media content may be searched for supplemental content, or predefined links to supplemental content. The remote databases may be ebook or media databases that are accessible from the media guidance application via a home network (e.g. LAN) or the Internet. The searches may be performed by the media guidance application in one or more media databases in order to obtain search results. The search query may be created using selected text as well as information about an ebook, in particular location within the ebook.

A manifest file for the ebook may be received by the media guidance application running on the user device and which may include all of the ebook text and additional metadata and arrangement information for the ebook. One common file type is an EPUB file which sets the standards for the file contents, and manifest file contents. Other types of ebook file types may have similar standards and requirements and could also be used to perform the features and functionality described herein. Manifest file information can be used to form the search query, in particular, location information for the selected text used to initiate a search query, can be used in the search query. For example, a chapter or location of the ebook page from which the text portion is located may be added to the search query, or used to filter search results so that the results are focused on a particular point in the progression of the ebook story. In another example, a title of the ebook may be taken from the manifest title to add to the search query so that the search query is focused in the context of the book. Other details about the ebook could also be taken from the manifest file to add to a search query, or to be used to filter search results.

The search results for a search query may yield a single related supplemental content item, which may then be automatically displayed by media guidance application on the user device. In some examples, multiple search results for a search query may be presented, for example, as shown in FIG. 5 which depicts a user device 500 and five search results 510, 520, 530, 540 and 550. The user device 500 may be the same user device used previously for the ebook reader, e.g., 100, 200, 300 or 400 (FIGS. 1-4). Alternatively, the search results may be presented on another separate user device. The search results 510, 520, 530 and 540, which are all related to Beauty and the Beast, are different versions of movies that were created in different years. For a search generated from 450 (FIG. 4), which is the Beastly Kendra Chronicles, search result 530 for the Beastly movie may be particularly relevant, or search result 520 for an episode of the television series Beauty and the Beast. A search generated from 250 (FIG. 2) from the picture book Beauty and the Beast, may yield a search result 550 Beauty and the Beast, a 1984 cartoon production, or the more recent 2017 Disney production in search result 510. Each of these search results may be selected and ranked in a list using version information and other details from the manifest file for the ebook. Although the results in FIG. 5 are shown in chronological order, the results could be shown in accordance with relevancy, user preferences, or other ordering.

Each of the ebooks shown in FIG. 2—a children's version of the book Beauty and the Beast, and FIG. 4—a young adults book loosely based on Beauty and the Beast may have manifest file data and metadata that references information about the book that may be relevant in associating supplemental content. For example, the young adults book may include an age group category indicating that it is not a child's book. Thus, a search for content originating from the Beastly Kendra Chronicles in FIG. 4 may not yield a matching result for a cartoon adaptation of Beauty and the Beast. Of course, if the media guidance application determines that the reader's user profile has a history of watching cartoons, such cartoon adaptation may be included. A search initiated within the ebook text of the Beastly Kendra Chronicles could also include Beauty and the Beast related results because metadata for the book would include that the book is a loose adaptation of the old story.

In another example, the child's book may also have an age group category indicating that it is a child's book. Thus, a search for supplemental content originating from the child's book version would not yield a search result for the television series, Beauty and the Beast which has a television rating of TV-14 and has a parent advisory for content, despite the child's book having the same title as the television series. In some scenarios, if a user profile for the reader of the child's book includes some adult material, then the television show episodes may be included in the results listing.

For searches from either of the text of FIG. 2 or FIG. 4, the search results and supplemental content may be provided with an option to view on a parent or child device so that, for example, if a child is reading the child's version of Beauty and the Beast, a parent may wish to watch an episode of the Beastly Kendra Chronicles that is related to the progression in the book that they have just read with their child. In that scenario, the media guidance application will determine the location of the reader in the ebook text using the manifest file using the selected text in the ebook text, and search a data media database for supplemental content and narrow the focus of the results to episodes that overlap in progression of the story. Finding the suitable episodes according to the timeline or progression of the story can be determined using percentages of the book completed, by using closed caption metadata for an episode and matching it to keywords or surrounding text in the chapter or chapter summary in the ebook manifest file, using user generated commentary such as episode recaps and matching such commentary with a chapter summary, or other technique.

Receipt of a user selection of the search results by the media guidance application, for example, search result 510, will lead to the supplemental content being delivered to the user device, e.g., as shown in FIG. 6. FIG. 6 shows a user device 600 showing Disney's Beauty and the Beast 610 which may be obtained by selecting the respective supplemental content from the screen in FIG. 5. In some scenarios, the display may include an option 620 to return to the ebook file. Selection of option 620 will cause the media guidance application to return the reader's display to the ebook text. In some examples, selection of the option 620 will cause the media guidance application to return the reader to a display of the selected portion of text that was used to generate the query for the supplemental content. In another example, selection of option 620 will cause the media guidance application to generate a display of the last page accessed by the reader. In general, when the reader returns to the ebook, visual cues within the ebook text for supplemental content may be different so that the user knows that they have already selected or viewed such supplemental content. When the reader accesses supplemental content, the access may be recorded in a user history by the media guidance application, and the user history may be used by the media guidance application to generate displays of links to such content in a different manner.

If the option 620 is selected, turning to FIG. 7, the reader may return to the text of the ebook in device 705 and continue reading the ebook text 710. Since the reader has already viewed the supplemental content, the visual cues for associated supplemental content may be shown differently—e.g., "The Beast" is shown in italics. The user may have the option of sharing the supplemental content to a second device 715 to show the supplemental content 720 on a second device.

An example of an ebook data file 800 is shown in FIG. 8. As shown, there are a number of containers of details about the ebook that may be included in the data file. The manifest file may include arrangement information for the ebook file contents. In some examples, the manifest file may be used to refer to ebook data overall in any container. The ebook data file 800 may include identifier information 810. The identifier information 810 may include an ISBN number for a book or other identifier. Metadata 820 for a book file 800 can include data about the book file data and can include any number or types of details about the book file. Metadata 820 for the file can include reader notes, publisher notes, public comments, etc. The metadata 820 may also include other details about the book 825, such as the title, book description, source of the book, relation of the book, e.g., to other books in a series of books, or to movie adaptations, comic book adaptations, etc. The metadata 820 may also include book coverage information and rights to the content. The media guidance application can update the metadata 820 contents to include, for example, links to supplemental content identified for the ebook, and in particular, links to supplemental content identified for particular portions of the ebook. Such metadata may be updated periodically by the media guidance application to include updated links and most relevant links based on a user profile, user access history, media subscriptions, etc. Manifest file data 830 can include details about the arrangement of the ebook file data and can be used to identify in the datafile 800 data that is relevant to a display screen of the ebook. Manifest file 830 includes details 835 about the chapters of the books, introductions, an afterword for the book and other content sections for the book. Spine 840 data may include information about the book spine. Other details about the data file 800 can also be stored in database 850. For example, user generated data may be stored in a database 850 and made available to other readers of the ebook. An example of user generated data can be highlighting and commenting on text portions. In another example, a reader may identify supplemental content that is related to a text portion and can highlight the text portion in the book and link to the supplemental content and the reader. This linking can be stored in the database 850.

Ebook interfaces on user devices may have similarities to interfaces for other types of media accessed on user devices. For example, a media guidance application may provide ways to search and deliver media content in the same ways to provide supplemental content, such as a movie adaptation to a book.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, ebook reader, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 9:
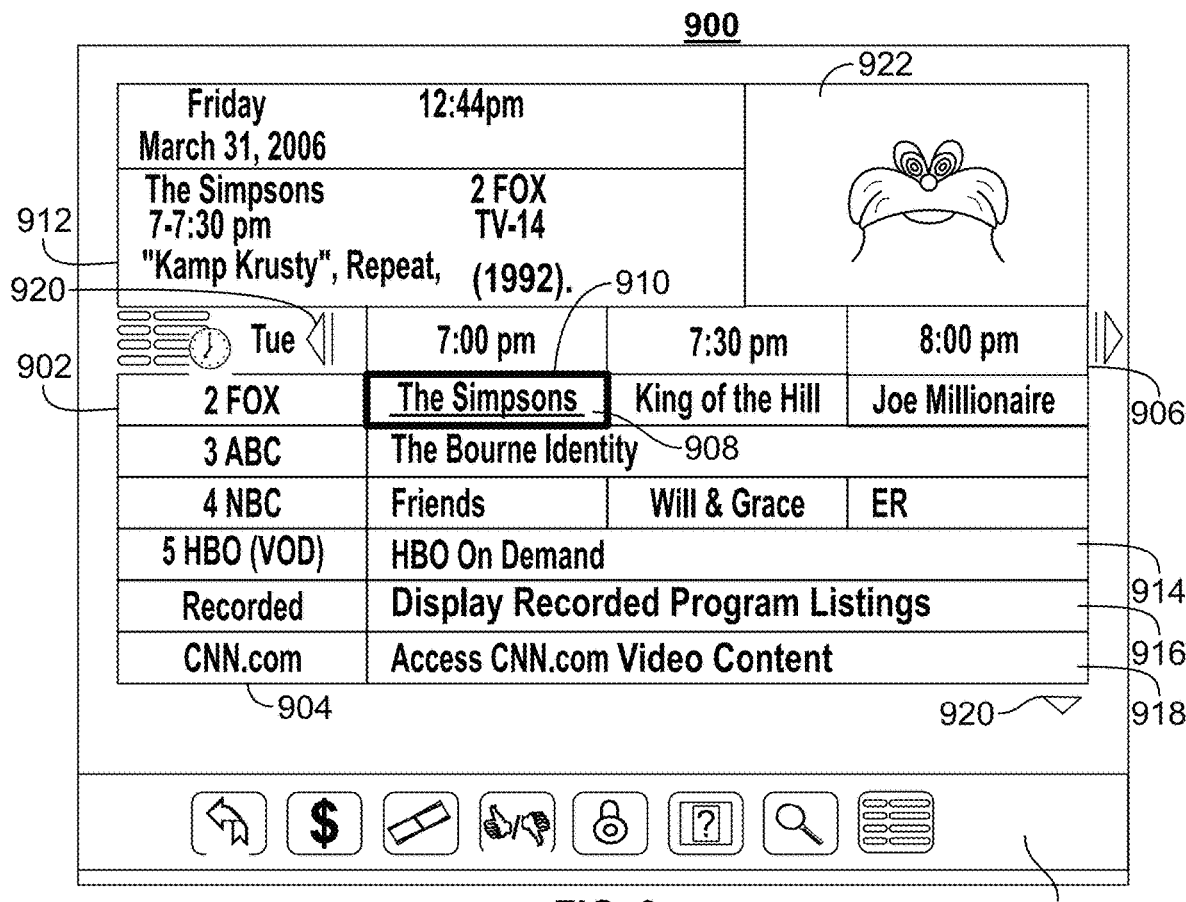
FIGS. 9-10 show other illustrative examples of display screens generated by a media guidance application in accordance with some embodiments of the disclosure.
Figure 10:
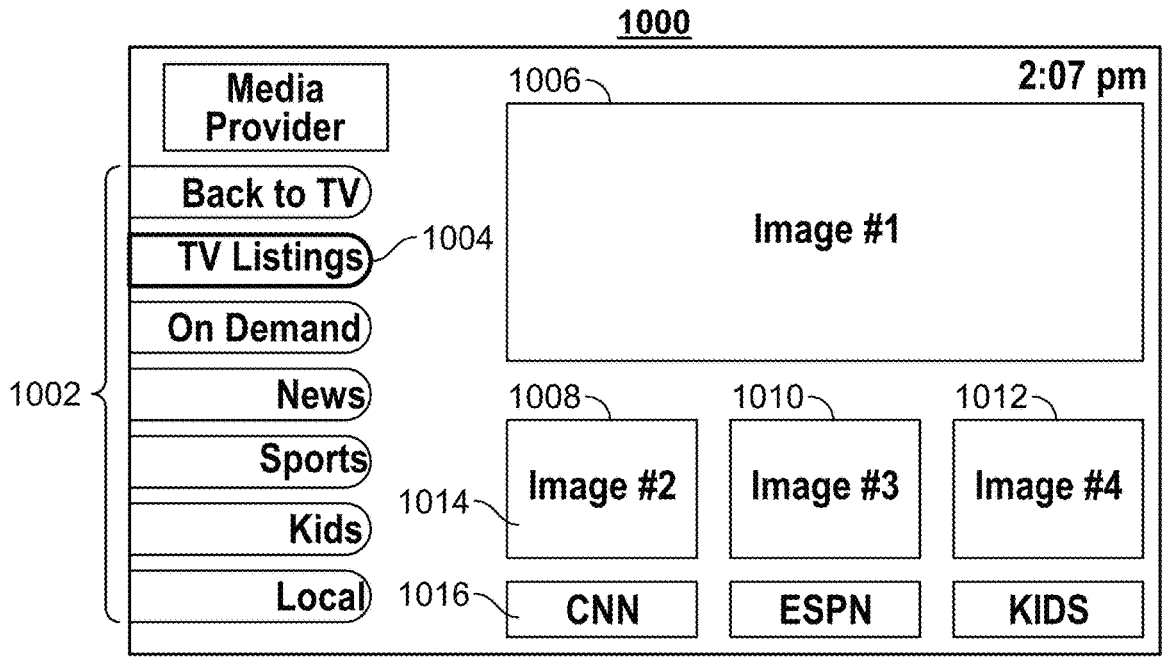

FIGS. 9-10 show illustrative display screens that may be used to provide media guidance data. The display screens shown in FIGS. 9-10 may be implemented on any suitable user equipment device or platform. While the displays of FIGS. 9-10 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 9 shows illustrative grid of a program listings display 900 arranged by time and channel that also enables access to different types of content in a single display. Display 900 may include grid 902 with: (1) a column of channel/content type identifiers 904, where each channel/content type identifier (which is a cell in the column) identifies a different channel or content type available; and (2) a row of time identifiers 906, where each time identifier (which is a cell in the row) identifies a time block of programming. Grid 902 also includes cells of program listings, such as program listing 908, where each listing provides the title of the program provided on the listing's associated channel and time. With a user input device, a user can select program listings by moving highlight region 910. Information relating to the program listing selected by highlight region 910 may be provided in program information region 912. Region 912 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 902 may provide media guidance data for non-linear programming including on-demand listing 914, recorded content listing 916, and Internet content listing 918. A display combining media guidance data for content from different types of content sources is sometimes referred to as a "mixed-media" display. Various permutations of the types of media guidance data that may be displayed that are different than display 900 may be based on user selection or guidance application definition (e.g., a display of only recorded and broadcast listings, only on-demand and broadcast listings, etc.). As illustrated, listings 914, 916, and 918 are shown as spanning the entire time block displayed in grid 902 to indicate that selection of these listings may provide access to a display dedicated to on-demand listings, recorded listings, or Internet listings, respectively. In some embodiments, listings for these content types may be included directly in grid 902. Additional media guidance data may be displayed in response to the user selecting one of the navigational icons 920. (Pressing an arrow key on a user input device may affect the display in a similar manner as selecting navigational icons 920.)

Display 900 may also include video region 922, and options region 926. Video region 922 may allow the user to view and/or preview programs that are currently available, will be available, or were available to the user. The content of video region 922 may correspond to, or be independent from, one of the listings displayed in grid 902. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 926 may allow the user to access different types of content, media guidance application displays, and/or media guidance application features. Options region 926 may be part of display 900 (and other display screens described herein), or may be invoked by a user by selecting an on-screen option or pressing a dedicated or assignable button on a user input device. The selectable options within options region 926 may concern features related to program listings in grid 902 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 12. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 10. Video mosaic display 1000 includes selectable options 1002 for content information organized based on content type, genre, and/or other organization criteria. In display 1000, television listings option 1004 is selected, thus providing listings 1006, 1008, 1010, and 1012 as broadcast program listings. In display 1000 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 1008 may include more than one portion, including media portion 1014 and text portion 1016. Media portion 1014 and/or text portion 1016 may be selectable to view content in full-screen or to view information related to the content displayed in media portion 1014 (e.g., to view listings for the channel that the video is displayed on).

The listings in display 1000 are of different sizes (i.e., listing 1006 is larger than listings 1008, 1010, and 1012), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 11:
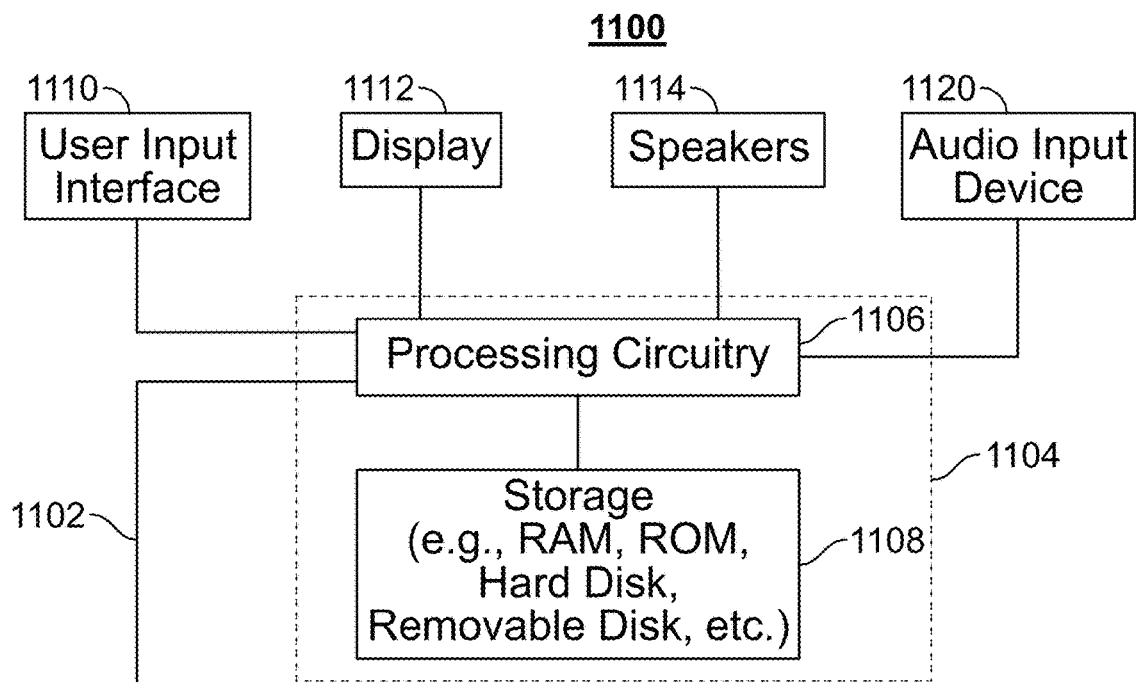
FIG. 11 is a block diagram of an illustrative user equipment device in accordance with some embodiments of the disclosure.

Users may access content and the media guidance application (and its display screens described above and below) from one or more of their user equipment devices. FIG. 11 shows a generalized embodiment of illustrative user equipment device 1100. More specific implementations of user equipment devices are discussed below in connection with FIG. 12. User equipment device 1100 may receive content and data via input/output (hereinafter "I/O") path 1102. I/O path 1102 may provide content (e.g., broadcast programming, on-demand programming, Internet content, content available over a local area network (LAN) or wide area network (WAN), and/or other content) and data to control circuitry 1104, which includes processing circuitry 1106 and storage 1108. Control circuitry 1104 may be used to send and receive commands, requests, and other suitable data using I/O path 1102. I/O path 1102 may connect control circuitry 1104 (and specifically processing circuitry 1106) to one or more communications paths (described below). I/O functions may be provided by one or more of these communications paths, but are shown as a single path in FIG. 11 to avoid overcomplicating the drawing.

Control circuitry 1104 may be based on any suitable processing circuitry such as processing circuitry 1106. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1104 executes instructions for a media guidance application stored in memory (i.e., storage 1108). Specifically, control circuitry 1104 may be instructed by the media guidance application to perform the functions discussed above and below. For example, the media guidance application may provide instructions to control circuitry 1104 to generate the media guidance displays. In some implementations, any action performed by control circuitry 1104 may be based on instructions received from the media guidance application.

In client-server based embodiments, control circuitry 1104 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 12). In addition, communications circuitry may include circuitry that enables peer-to-peer communication of user equipment devices, or communication of user equipment devices in locations remote from each other (described in more detail below).

Memory may be an electronic storage device provided as storage 1108 that is part of control circuitry 1104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1108 may be used to store various types of content described herein as well as media guidance data described above. Nonvolatile memory may also be used (e.g., to launch a boot-up routine and other instructions). Cloud-based storage, described in relation to FIG. 12, may be used to supplement storage 1108 or instead of storage 1108.

Control circuitry 1104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1104 may also include scaler circuitry for upconverting and downconverting content into the preferred output format of the user equipment 1100. Circuitry 1104 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1108 is provided as a separate device from user equipment 1100, the tuning and encoding circuitry (including multiple tuners) may be associated with storage 1108.

A user may send instructions to control circuitry 1104 using user input interface 1110. User input interface 1110 may be any suitable user interface, such as a remote control, mouse, trackball, keypad, keyboard, touch screen, touchpad, stylus input, joystick, voice recognition interface, or other user input interfaces. Display 1112 may be provided as a stand-alone device or integrated with other elements of user equipment device 1100. For example, display 1112 may be a touchscreen or touch-sensitive display. In such circumstances, user input interface 1110 may be integrated with or combined with display 1112. Display 1112 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1112 may be HDTV-capable. In some embodiments, display 1112 may be a 3D display, and the interactive media guidance application and any suitable content may be displayed in 3D. A video card or graphics card may generate the output to the display 1112. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1104. The video card may be integrated with the control circuitry 1104. Speakers 1114 may be provided as integrated with other elements of user equipment device 1100 or may be stand-alone units. The audio component of videos and other content displayed on display 1112 may be played through speakers 1114. In some embodiments, the audio may be distributed to a receiver (not shown), which processes and outputs the audio via speakers 1114.

The guidance application may be implemented using any suitable architecture. For example, it may be a stand-alone application wholly-implemented on user equipment device 1100. In such an approach, instructions of the application are stored locally (e.g., in storage 1108), and data for use by the application is downloaded on a periodic basis (e.g., from an out-of-band feed, from an Internet resource, or using another suitable approach). Control circuitry 1104 may retrieve instructions of the application from storage 1108 and process the instructions to generate any of the displays discussed herein. Based on the processed instructions, control circuitry 1104 may determine what action to perform when input is received from input interface 1110. For example, movement of a cursor on a display up/down may be indicated by the processed instructions when input interface 1110 indicates that an up/down button was selected.

In some embodiments, the media guidance application is a client-server based application. Data for use by a thick or thin client implemented on user equipment device 1100 is retrieved on-demand by issuing requests to a server remote to the user equipment device 1100. In one example of a client-server based guidance application, control circuitry 1104 runs a web browser that interprets web pages provided by a remote server. For example, the remote server may store the instructions for the application in a storage device. The remote server may process the stored instructions using circuitry (e.g., control circuitry 1104) and generate the displays discussed above and below. The client device may receive the displays generated by the remote server and may display the content of the displays locally on equipment device 1100. This way, the processing of the instructions is performed remotely by the server while the resulting displays are provided locally on equipment device 1100. Equipment device 1100 may receive inputs from the user via input interface 1110 and transmit those inputs to the remote server for processing and generating the corresponding displays. For example, equipment device 1100 may transmit a communication to the remote server indicating that an up/down button was selected via input interface 1110. The remote server may process instructions in accordance with that input and generate a display of the application corresponding to the input (e.g., a display that moves a cursor up/down). The generated display is then transmitted to equipment device 1100 for presentation to the user.

In some embodiments, the media guidance application is downloaded and interpreted or otherwise run by an interpreter or virtual machine (run by control circuitry 1104). In some embodiments, the guidance application may be encoded in the ETV Binary Interchange Format (EBIF), received by control circuitry 1104 as part of a suitable feed, and interpreted by a user agent running on control circuitry 1104. For example, the guidance application may be an EBIF application. In some embodiments, the guidance application may be defined by a series of JAVA-based files that are received and run by a local virtual machine or other suitable middleware executed by control circuitry 1104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 12:
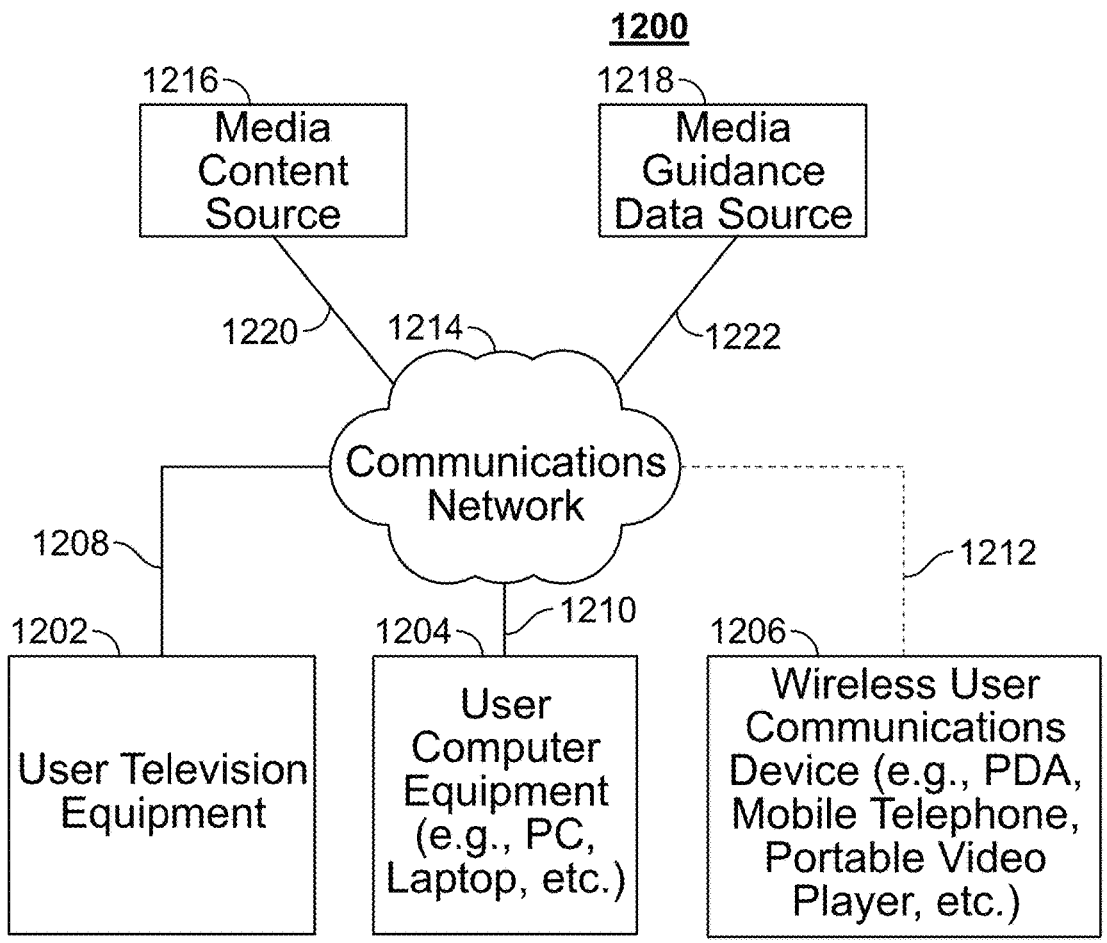
FIG. 12 is a block diagram of an illustrative media system in accordance with some embodiments of the disclosure.

User equipment device 1100 of FIG. 11 can be implemented in system 1200 of FIG. 12 as user television equipment 1202, user computer equipment 1204, wireless user communications device 1206, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 11 may not be classified solely as user television equipment 1202, user computer equipment 1204, or a wireless user communications device 1206. For example, user television equipment 1202 may, like some user computer equipment 1204, be Internet-enabled allowing for access to Internet content, while user computer equipment 1204 may, like some television equipment 1202, include a tuner allowing for access to television programming. The media guidance application may have the same layout on various different types of user equipment or may be tailored to the display capabilities of the user equipment. For example, on user computer equipment 1204, the guidance application may be provided as a web site accessed by a web browser. In another example, the guidance application may be scaled down for wireless user communications devices 1206.

In system 1200, there is typically more than one of each type of user equipment device but only one of each is shown in FIG. 12 to avoid overcomplicating the drawing. In addition, each user may utilize more than one type of user equipment device and also more than one of each type of user equipment device.

In some embodiments, a user equipment device (e.g., user television equipment 1202, user computer equipment 1204, wireless user communications device 1206) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1214. Namely, user television equipment 1202, user computer equipment 1204, and wireless user communications device 1206 are coupled to communications network 1214 via communications paths 1208, 1210, and 1212, respectively. Communications network 1214 may be one or more networks including the Internet, a mobile phone network, mobile voice or data network (e.g., a 4G or LTE network), cable network, public switched telephone network, or other types of communications network or combinations of communications networks. Paths 1208, 1210, and 1212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1212 is drawn with dotted lines to indicate that in the exemplary embodiment shown in FIG. 12 it is a wireless path and paths 1208 and 1210 are drawn as solid lines to indicate they are wired paths (although these paths may be wireless paths, if desired). Communications with the user equipment devices may be provided by one or more of these communications paths, but are shown as a single path in FIG. 12 to avoid overcomplicating the drawing.

Although communications paths are not drawn between user equipment devices, these devices may communicate directly with each other via communication paths, such as those described above in connection with paths 1208, 1210, and 1212, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1214.

System 1200 includes content source 1216 and media guidance data source 1218 coupled to communications network 1214 via communication paths 1220 and 1222, respectively. Paths 1220 and 1222 may include any of the communication paths described above in connection with paths 1208, 1210, and 1212. Communications with the content source 1216 and media guidance data source 1218 may be exchanged over one or more communications paths, but are shown as a single path in FIG. 12 to avoid overcomplicating the drawing. In addition, there may be more than one of each of content source 1216 and media guidance data source 1218, but only one of each is shown in FIG. 12 to avoid overcomplicating the drawing. (The different types of each of these sources are discussed below.) If desired, content source 1216 and media guidance data source 1218 may be integrated as one source device. Although communications between sources 1216 and 1218 with user equipment devices 1202, 1204, and 1206 are shown as through communications network 1214, in some embodiments, sources 1216 and 1218 may communicate directly with user equipment devices 1202, 1204, and 1206 via communication paths (not shown) such as those described above in connection with paths 1208, 1210, and 1212.

Content source 1216 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1216 may be the originator of content (e.g., a television broadcaster, a Webcast provider, etc.) or may not be the originator of content (e.g., an on-demand content provider, an Internet provider of content of broadcast programs for downloading, etc.). Content source 1216 may include cable sources, satellite providers, on-demand providers, Internet providers, over-the-top content providers, or other providers of content. Content source 1216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1218 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1218 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1218 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1218 may provide user equipment devices 1202, 1204, and 1206 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1108, and executed by control circuitry 1104 of a user equipment device 1100. In some embodiments, media guidance applications may be client-server applications where only a client application resides on the user equipment device, and server application resides on a remote server. For example, media guidance applications may be implemented partially as a client application on control circuitry 1104 of user equipment device 1100 and partially on a remote server as a server application (e.g., media guidance data source 1218) running on control circuitry of the remote server. When executed by control circuitry of the remote server (such as media guidance data source 1218), the media guidance application may instruct the control circuitry to generate the guidance application displays and transmit the generated displays to the user equipment devices. The server application may instruct the control circuitry of the media guidance data source 1218 to transmit data for storage on the user equipment. The client application may instruct control circuitry of the receiving user equipment to generate the guidance application displays.

Content and/or media guidance data delivered to user equipment devices 1202, 1204, and 1206 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1200 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 12.

In one approach, user equipment devices may communicate with each other within a home network. User equipment devices can communicate with each other directly via short-range point-to-point communication schemes described above, via indirect paths through a hub or other similar device provided on a home network, or via communications network 1214. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1216 to access content. Specifically, within a home, users of user television equipment 1202 and user computer equipment 1204 may access the media guidance application to navigate among and locate desirable content. Users may also access the media guidance application outside of the home using wireless user communications devices 1206 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1214. These cloud resources may include one or more content sources 1216 and one or more media guidance data sources 1218. In addition or in the alternative, the remote computing sites may include other user equipment devices, such as user television equipment 1202, user computer equipment 1204, and wireless user communications device 1206. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1204 or wireless user communications device 1206 having content capture feature. Alternatively, the user can first transfer the content to a user equipment device, such as user computer equipment 1204. The user equipment device storing the content uploads the content to the cloud using a data transmission service on communications network 1214. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 11.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 13:
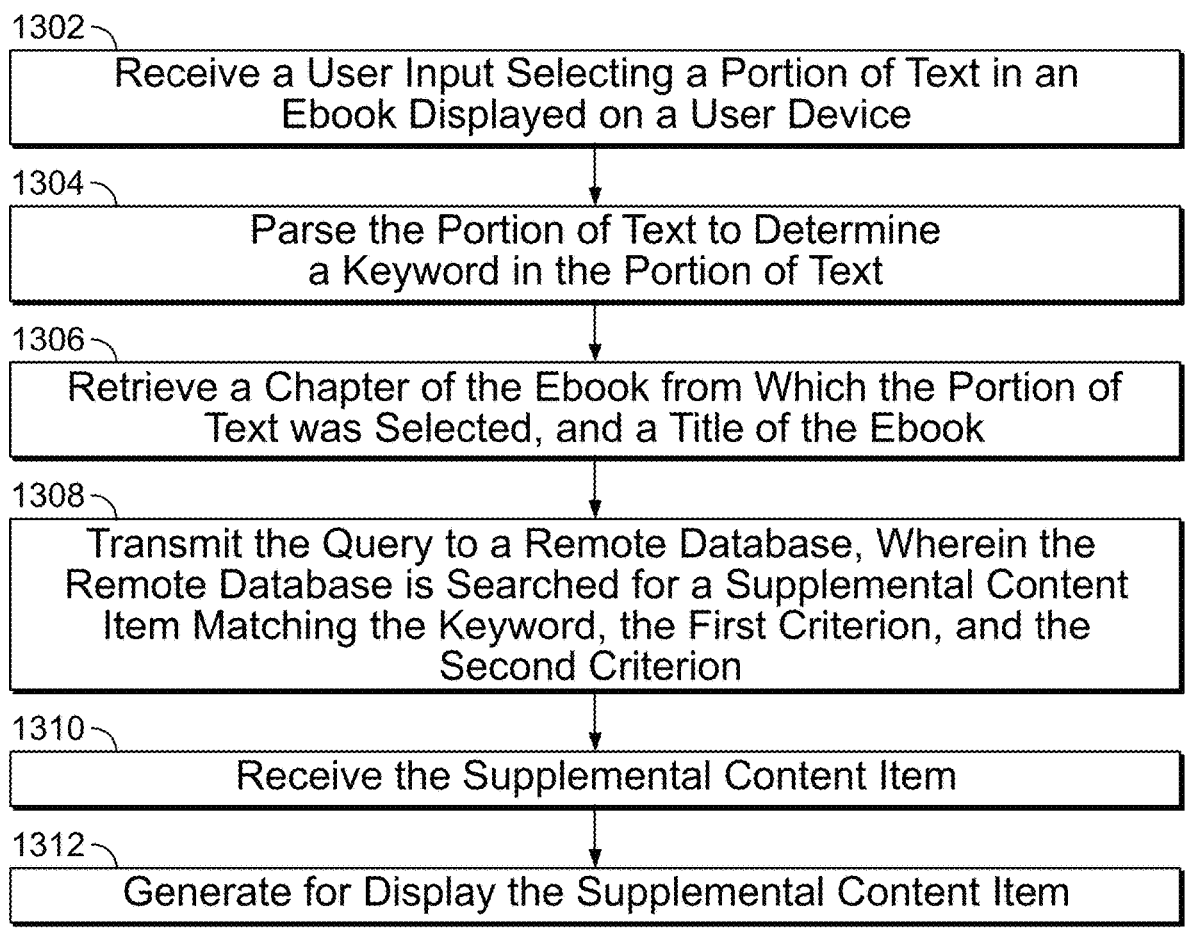
FIGS. 13-14 are flowcharts of illustrative processes for searching for supplemental content for an ebook in accordance with some embodiments of the disclosure.

FIG. 13 is a flowchart of illustrative steps of a process 1300 for creating a query to search for supplemental content for an ebook in accordance with some embodiments of the disclosure. It should be noted that process 1300 or any step thereof could be performed on, or provided by, any of the devices shown in FIGS. 11-12. For example, process 1300 may be executed by control circuitry 1104 (FIG. 11) as instructed by a media guidance application implemented on a user device (e.g., user equipment devices 1202, 1204, and/or 1206 (FIG. 12)) in order to search for supplemental content. In addition, one or more steps of process 1300 may be incorporated into or combined with one or more steps of any other process or embodiment described herein.

Process 1300 depicts a process for creating a query for supplemental content for an ebook and then generating the supplemental content. The process 1300 begins with control circuitry 1104 for a media guidance application receiving a selection by a reader of an ebook of a portion of text in an ebook display on a user device that will be used to form a search query for supplemental content related to the ebook, in particular, the selected portion of the ebook. A reader may select a portion of text in an ebook display. The selection of the portion input is received by control circuitry 1104 for the media guidance application at step 1302. An example of a selected portion of text may be, for example, text 250 or 450 (FIGS. 2 & 4, respectively). In some scenarios, the user input of a selected portion may be automatically performed by the media guidance application and obtained from an ebook metadata file for a chapter summary, keyword information, or an ebook database of book reviews, book descriptions, or other book data aggregator sources.

The user input may be received by control circuitry 1104 for the media guidance application and then analyzed or parsed to the determine a keyword at step 1304. The keyword or keywords parsed from the selected text may be obtained using linguistic analysis to identify terms in the selected text that may be nouns or that may have some significance as determined using metadata from the ebook file, e.g., 820 (FIG. 8). A manifest file for the ebook (e.g., 830, FIG. 8) may be obtained by the control circuitry 1104 to identify criteria about the ebook that may be relevant to create a search query. The manifest file may yield information about the chapter from which the selected portion of the text originated.

The chapter information may be retrieved at step 1306 by the control circuitry 1104 from the manifest file 830. In addition, title information for the ebook may be retrieved from the manifest file 830 by control circuitry 1104 for the media guidance application. The chapter and title information may be included in an index in the manifest file 830 and the chapter may be discerned using chapter or book content hierarchy information from the manifest file 830.

A search query may be generated based on the keyword, and criteria from the manifest file—the chapter and title—may be sent from the user device, e.g., 1206, by control circuitry 1104 for the media guidance application to a remote database at step 1308 to search for supplemental content. The remote database may be a database of media content, and may be one or more databases. The remote databases may be accessible via a network. Using the above examples, the remote media databases may be searched for matching content and the search may be refined using progression information for the story and matching it to metadata for media assets. For example, when searching for "be our guest" 250 from the ebook shown in FIG. 2, a video clip of the song may be found as a matching supplemental content item. In addition, the movie Beauty and the Beast may be identified and in particular, the portion of the movie in which the song appears may be identified using closed caption information for the movie to identify where the song appears. The matching movie may be presented as supplemental content and be shown from the point where the song appears in the movie. Similarly, for a tag line that is delivered verbally or visually, the tagline could be identified using closed caption data and presented to the user at the point in time that the tagline appears. In addition to searching closed caption data, the media guidance application may also search user generated commentary about a media asset to further refine point in time details for showing related supplemental content.

The remote database will supply matching search results to the query to the control circuitry 1104 for the media guidance application, and in some scenarios, a list of matching search results may be shown to the user for selection. Such list would be generated by control circuitry 1104 for the media guidance application for display on the user device. In other examples, one matching supplemental content item will be automatically received by control circuitry 1104 for the media guidance application at step 1310. The received supplemental content can be generated into a display for the user at step 1312. The search results and the query may be refined according the steps shown in FIG. 15.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 13.

Figure 14:
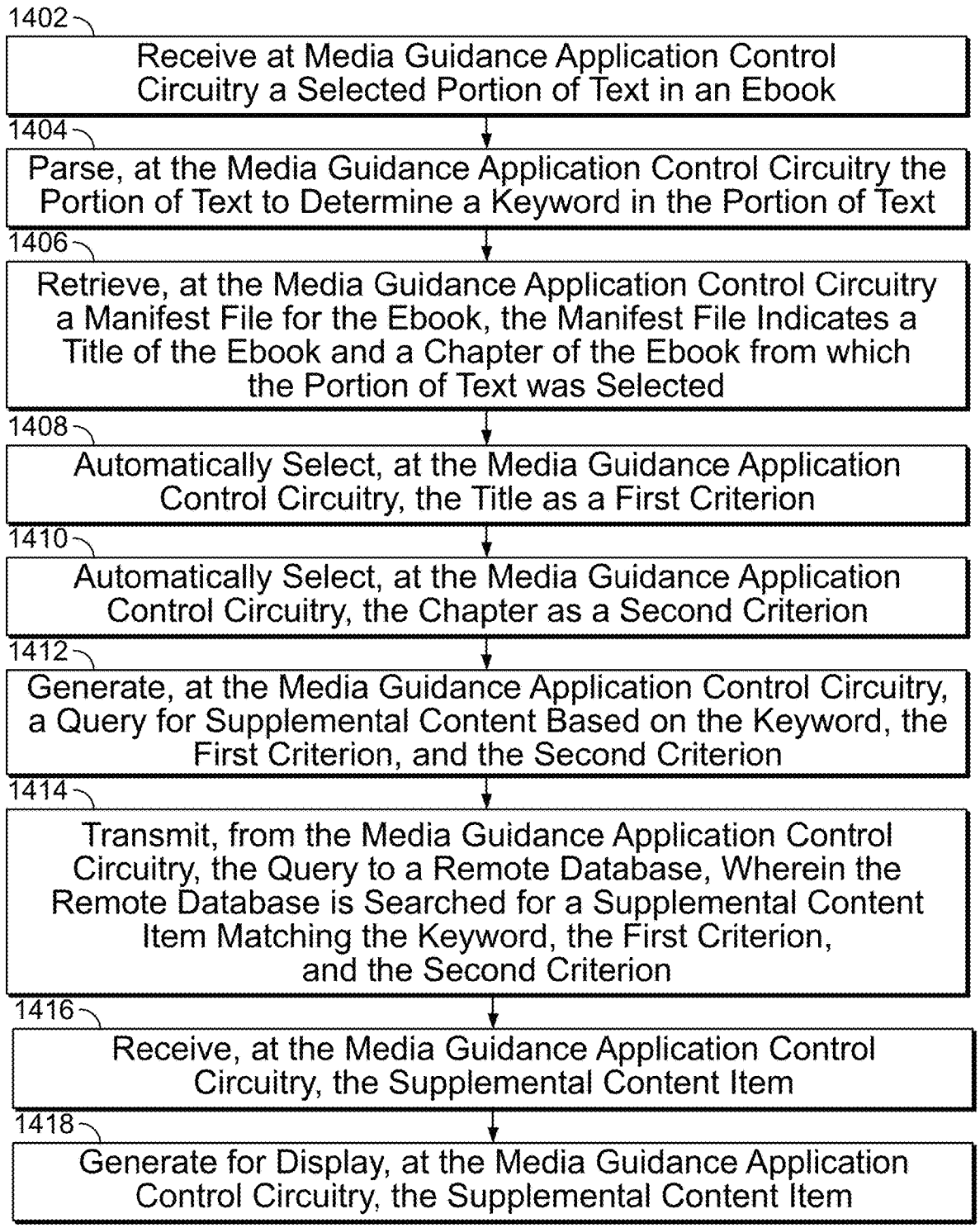

FIG. 14 is a flowchart of illustrative steps of a process 1400 for creating a query to search for supplemental content for an ebook in accordance with some embodiments of the disclosure. It should be noted that process 1400 or any step thereof could be performed on, or provided by, any of the devices shown in FIGS. 11-12. For example, process 1400 may be executed by control circuitry 1104 (FIG. 11) as instructed by a media guidance application implemented on a user device (e.g., user equipment devices 1202, 1204, and/or 1206 (FIG. 12)) in order to search for supplemental content. In addition, one or more steps of process 1400 may be incorporated into or combined with one or more steps of any other process or embodiment described herein.

Process 1400 depicts a process for creating a query for supplemental content for an ebook and then generating the supplemental content. The process 1400 begins with control circuitry 1104 for a media guidance application receiving a selection by a reader of an ebook of a portion of text in an ebook display on a user device that will be used to form a search query for supplemental content related to the ebook, in particular, the selected portion of the ebook. A reader may select a portion of text in an ebook display. The selection of the portion input is received by control circuitry 1104 for the media guidance application at step 1402. An example of a selected portion of text may be, for example, text 250 or 450 (FIGS. 2 & 4, respectively). In some scenarios, the selected portion received by the media guidance application may be automatically received by the media guidance application using an ebook file of ebook text and respective manifest file information, together with information about the ebook text from metadata for the ebook that includes chapter summaries, taglines, keywords, or ebook commentary from book reviews, book seller listings, book blogs, or other ebook information sources.

The user input may be received by control circuitry 1104 for the media guidance application and then analyzed or parsed to the determine a keyword at step 1404. The keyword or keywords parsed from the selected text may be obtained using linguistic analysis to identify terms in the selected text that may be nouns or that may have some significance as determined using metadata from the ebook file, e.g., 820 (FIG. 8). A manifest file for the ebook (e.g., 830, FIG. 8) may be obtained by the control circuitry 1104 to identify criteria about the ebook that may be relevant to create a search query. The manifest file may yield information about the chapter from which the selected portion of the text originated.

The manifest file may be retrieved at step 1406 by the control circuitry 1104, e.g., the manifest file 830 to obtain chapter and title information for the ebook. The chapter and title information may be included in an index in the manifest file 830 and the chapter may be discerned by the control circuitry 1104 for the media guidance application using chapter or book content hierarchy information from the manifest file 830.

At step 1408, the control circuitry 1104 for the media guidance application will automatically select the retrieved title as a first criterion to include in the search query. At this step, the search query will include the keyword from step 1404 and the selected criteria of the title. Thus, in the example from FIG. 2, "be our guest" as a selected portion of text may yield a keyword of "guest" or a keyword phrase "be our guest" because "be our guest" is a tagline for Beauty and the Beast and which may be noted in metadata 820 for the ebook, and a search query initiated with "be our guest" would have added a criterion for the book title Beauty and the Beast. Adding this criterion would cause the search to be focused within the context of the book. Similarly, using the book example from FIG. 4, the selected text portion "there was my beast face again" would cause a search for a keyword phrase of the nouns in the portion—"beast face", and the title of the book—Beastly Kendra Chronicles as a criterion for the search.

At step 1410, the control circuitry 1104 for the media guidance application will automatically select the retrieved chapter from the manifest file to include in the search query as a second criterion. In the above examples, this would cause a locator (if a chapter is not available) to be associated with the Beauty and the Beast search from FIG. 2, and for the Beastly Kendra Chronicles search from FIG. 4, chapter 3 (435) may be included in the search query as another criterion. Using the locator information can add additional context to the search because the percentage progression of the location of the selected text can correlate approximately to certain items of media. In addition, chapter summary information for, for example, chapter 3 of the Beastly Kendra Chronicles can be parsed to find additional keywords that may be matched with media item description information or closed caption metadata or other media item details.

At step 1412, the control circuitry 1104 for the media guidance application will generate a query for supplemental content related to the ebook (using the determined keywords from step 1404, the first criterion—the chapter or location of the selected text—from step 1408, and the second criterion—the title of the ebook—from step 1410).

The generated search query may be sent from the user device, e.g., 1206, by control circuitry 1104 for the media guidance application to a remote database at step 1414 to search for supplemental content. The remote database may be a database of media content, and may be one or more databases. The remote databases may be accessible via a network. Using the above examples, the remote media databases may be searched for matching content and the search may be refined using progression information for the story and matching it to metadata for media assets. For example, when searching for "be our guest" 250 from the ebook shown in FIG. 2, a video clip of the song may be found as a matching supplemental content item. In addition, the movie Beauty and the Beast may be identified and in particular, the portion of the movie in which the song appears may be identified using closed caption information for the movie to identify where the song appears. The matching movie may be presented as supplemental content and be shown from the point where the song appears in the movie. Similarly, for a tag line that is delivered verbally or visually, the tagline could be identified using closed caption data and presented to the user at the point in time that the tagline appears. In addition to searching closed caption data, the media guidance application may also search user generated commentary about a media asset to further refine point in time details for showing related supplemental content.

The remote database will supply matching search results to the query to the control circuitry 1104 for the media guidance application, and in some scenarios, a list of matching search results may be shown to the user for selection. Such list would be generated by control circuitry 1104 for the media guidance application for display on the user device. In other examples, one matching supplemental content item will be automatically received by control circuitry 1104 for the media guidance application at step 1416. The received supplemental content can be generated into a display for the user at step 1418. The search results and query may be refined according the steps shown in FIG. 14.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 14.

Figure 15:
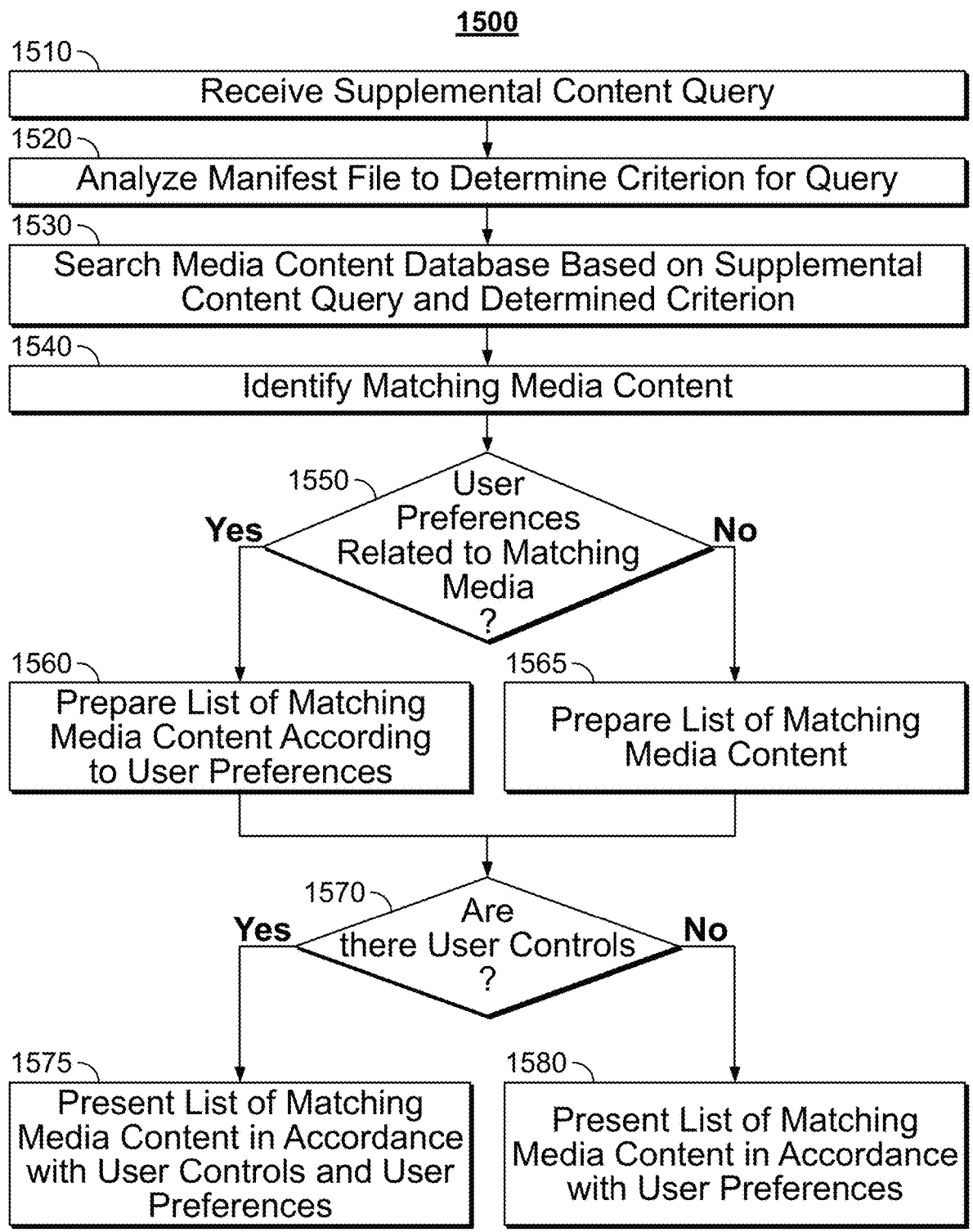
FIG. 15 is a flowchart of an illustrative process for generating a list of supplemental content for an ebook in accordance with some embodiments of the disclosure.

FIG. 15 is a flowchart of illustrative steps of a process 1500 for searching for supplemental content for an ebook in accordance with some embodiments of the disclosure. It should be noted that process 1500 or any step thereof could be performed on, or provided by, any of the devices shown in FIGS. 11-12. For example, process 1500 may be executed by control circuitry 1104 (FIG. 11) as instructed by a media guidance application implemented on a user device (e.g., user equipment devices 1202, 1204, and/or 1206 (FIG. 12)) in order to search for supplemental content. In addition, one or more steps of process 1500 may be incorporated into or combined with one or more steps of any other process or embodiment described herein.

Process 1500 may be followed to identify supplemental content related to an ebook. At step 1510, a query for supplemental content may be received by control circuitry 1104 for the media guidance application. The query may be initiated by a reader of an ebook selecting a portion of a book, e.g., 250 and 450, by selecting an option for supplemental content (e.g., buttons 260 and 460) or by selecting a highlighted portion of an ebook text that is indicated as having related content. In some scenarios, the selected portion received by the media guidance application may be automatically received by the media guidance application using an ebook file of ebook text and respective manifest file information, together with information about the ebook text from metadata for the ebook that includes chapter summaries, taglines, keywords, or ebook commentary from book reviews, book seller listings, book blogs, or other ebook information sources.

The user device control circuitry 1104 may analyze the ebook manifest file at step 1520 to determine criterion to include in the search query. For example, a manifest file 830 may include details about the book, chapters, and pages and may include a timeline for a progression of a story which may influence search results. Chapter summary information may also be available in metadata 820 which may be used to refine the search query.

At step 1530, control circuitry 1104 for the media guidance application may send a search query that is based on criterion from the manifest file and text for the supplemental content query, to a remote media database to search for matching supplemental content.

Matching supplemental content may be identified at step 1540 from the remote database. The matching to the query may be performed using metadata from the remote database for a media asset to find, for example, content that has suitable age ranges, genre types, description information relevant to the query.

In addition, user preference information may be used to enhance the search. The media guidance application may then determine which of the matching supplemental content to present to the user.

At step 1550, the control circuitry 1104 may check a user preference profile to determine whether there are any user preferences related to the matching supplemental content media items. For example, a user preference for ratings content may indicate a relative age of a user. Thus, for a search from the example in FIG. 4, from the Kendra Beastly Chronicles, a young adult book, search results may yield the television episodes for the Beauty and the Beast series which has a television rating of TV-15 and had parent content advisories. In contrast, a search from the example in FIG. 2, from the child's book Beauty and the Beast, search results may omit the television series because it is not suitable for a child. In addition, for a user that has a preference for cartoons, search results may include a cartoon adaptation of the book. On the other hand, for a user that has a preference for musicals, the live action version of Beauty and the Beast may be included in the search results.

If there are items that match the user preference profile, at step 1560, the control circuitry 1104 for the media guidance application may generate a list of matching supplemental content media items that are related to the user preferences. If there are no connections to the user preference profile, however, the user device will continue with the same list of matching supplemental content media items identified at step 1540.

Both of the lists from steps 1560 and 1565 will be checked for user controls at step 1570. The user controls may be to determine whether there are any access restrictions for the media items that may interfere with displaying the media items or which may make sharing the media items problematic. For example, a movie rating above PG-13, or television rating of TV-15 and above, or a designation of Explicit may cause the media item to be presented in a list in a restricted or noticeable manner. If, for example, a user wishes to restrict access to such types of content, but also has a user history of viewing such content, then, a search for, for example, from the child's book Beauty and the Beast in FIG. 2 may yield search results for the television series having the same title—Beauty and the Beast—but presented in a manner that makes it clear that it has a rating that exceeds the user preferences.

If there are user controls for the media items, at step 1575, a list of search results may be presented according to the user controls. If not, then the list of search results may be shown as from the prior steps 1560 and 1565. In some scenarios, a single search result may be identified as most relevant and the supplemental content item for that search result may be displayed automatically by the media guidance application on the reader's device or the second device.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 15.

Figure 16:
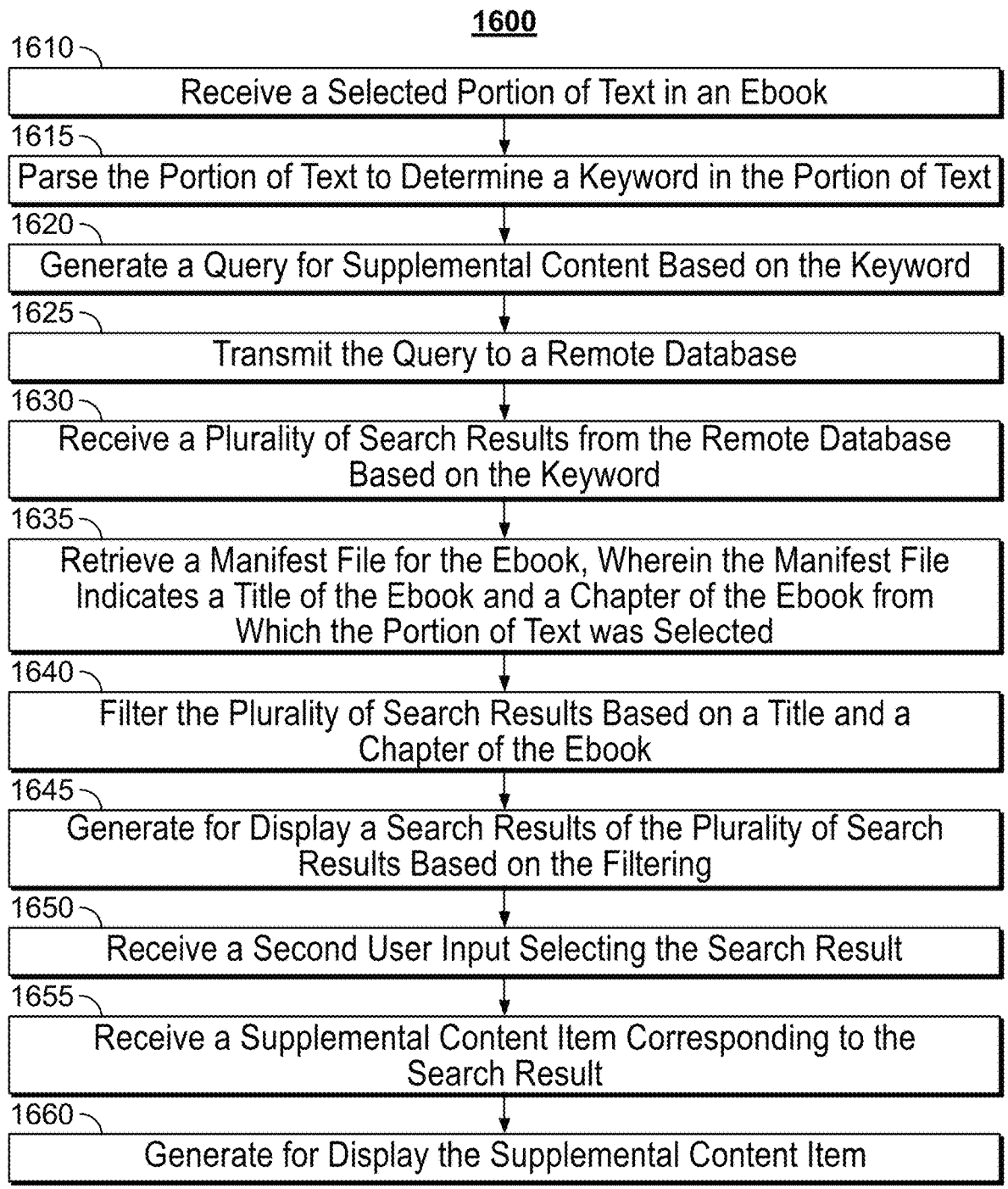
FIGS. 16-17 are flowcharts of illustrative processes for searching for supplemental content for an ebook in accordance with some embodiments of the disclosure.

FIG. 16 is a flowchart of illustrative steps of a process 1600 for filtering a search for supplemental content for an ebook in accordance with some embodiments of the disclosure. It should be noted that process 1600 or any step thereof could be performed on, or provided by, any of the devices shown in FIGS. 11-12. For example, process 1600 may be executed by control circuitry 1104 (FIG. 11) as instructed by a media guidance application implemented on a user device (e.g., user equipment devices 1202, 1204, and/or 1206 (FIG. 12)) in order to search for supplemental content. In addition, one or more steps of process 1600 may be incorporated into or combined with one or more steps of any other process or embodiment described herein.

FIG. 16 depicts an illustrative process 1600 for filtering a search query for supplemental content to an ebook using details from an ebook manifest file. At step 1610, a reader of an ebook may initiate a search for supplemental content by selecting a portion of text in an ebook, and the selected portion of text is received by control circuitry 1104 for the media guidance application. For example, a reader may select text from the ebook, or select a highlighted phrase in the ebook, e.g., 250 or 450 (FIGS. 2 and 4, respectively). For example, control circuitry 1104 may receive a user selection of text from the ebook. In some scenarios, the selected portion received by the media guidance application may be automatically received by the media guidance application using an ebook file of ebook text and respective manifest file information, together with information about the ebook text from metadata for the ebook that includes chapter summaries, taglines, keywords, or ebook commentary from book reviews, book seller listings, book blogs, or other ebook information sources.

At step 1615, the control circuitry 1104 for the media guidance application may parse the portion of selected text to determine a keyword in the portion of text. The keyword or keywords parsed from the selected text may be obtained using linguistic analysis to identify terms in the selected text that may be nouns or that may have some significance as determined using metadata from the ebook file, e.g., 820 (FIG. 8). The parsed keyword may be used as a basis for generating a search query at step 1620 by the control circuitry 1104.

The control circuitry 1104 for the user device may transmit the search query at step 1625 to a remote database to search for supplemental content matching the search query.

The remote database or more than one media databases may be searched for supplemental content matching the search query. Metadata for the media items may also be analyzed to find suitable matching content.

A plurality of results from the search of the keyword may be received at step 1630 by the control circuitry 1104 for the media guidance application from the remote database. Since there may be many search results, the results can be filtered to reduce the number of results or to improve the relevance of the results.

At step 1635, the control circuitry 1104 for the media guidance application may retrieve a manifest file for the ebook. The manifest file includes data about the ebook, including a title of the ebook and a chapter of the ebook from which the portion of text was selected. The manifest file, e.g, 830 may be obtained from the ebook file 800 and may include information relevant to the location of the portion of text used to initiate the search query. The manifest file details for the keyword source location can be helpful when identifying a clip of a movie that relates to a certain section of an ebook, or an episode in television series adaptation of the ebook, etc. For example, a search from the Beastly Kendra Chronicles from FIG. 4 or a search from Beauty and the Beast from FIG. 2 may be filtered by a criterion from the respective manifest file.

The control circuitry 1104 for the media guidance application may then use the two criterions from the manifest file—the title and chapter—to filter the search results at step 1640.

The filtered search results may be included in a final search result list that is generated for display at the user device at step 1645 by the control circuitry 1104 for the media guidance application. The final search result list may include search results matching the keyword and that have been filtered by the criterion identified from the manifest file 830 for the ebook. Thus, a plurality of search results for "be our guest" from a search initiated, for example, from the ebook in FIG. 2, may be filtered to remove instances of the American Horror Story episode titled "Be our Guest", for example, and filtered to include only items that are related to the book Beauty and the Beast.

At step 1650, the control circuitry 1104 for the media guidance application, for example, running on the ebook reader may receive a second user input selecting one of the search results in the search list generated at step 1645.

In response to the second user input selection, the user device may receive at step 1655 a supplemental content item corresponding to the selected search result. The supplemental content item may be received from a media content database, e.g., 1216 or other media source. The media content database may be selected for receipt of the supplemental content based on access availability for user and the media guidance application, quality or reliability of the data feed for the content, or based on the type of device on which the supplemental content will be delivered. For example, a television may benefit from a higher resolution source file for the supplemental content, while a portable device may benefit from a lighter or shorter version of the supplemental content. Network availability and capabilities may also influence the choice of media sources.

The received supplemental content item may be viewed in a display at step 1660. In some scenarios, the supplemental content display will be generated on the user device on which the search query was initiated on at step 1610. In other scenarios, the supplemental content display will be generated on a second user device.

In some scenarios where a media guidance application is performing searches for supplemental content automatically using selected text portions from the ebook text, the search results for the supplemental content may be stored in association with the text portion, for example, in metadata for the ebook file, or in an ebook database for related content.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 16.

Figure 17:
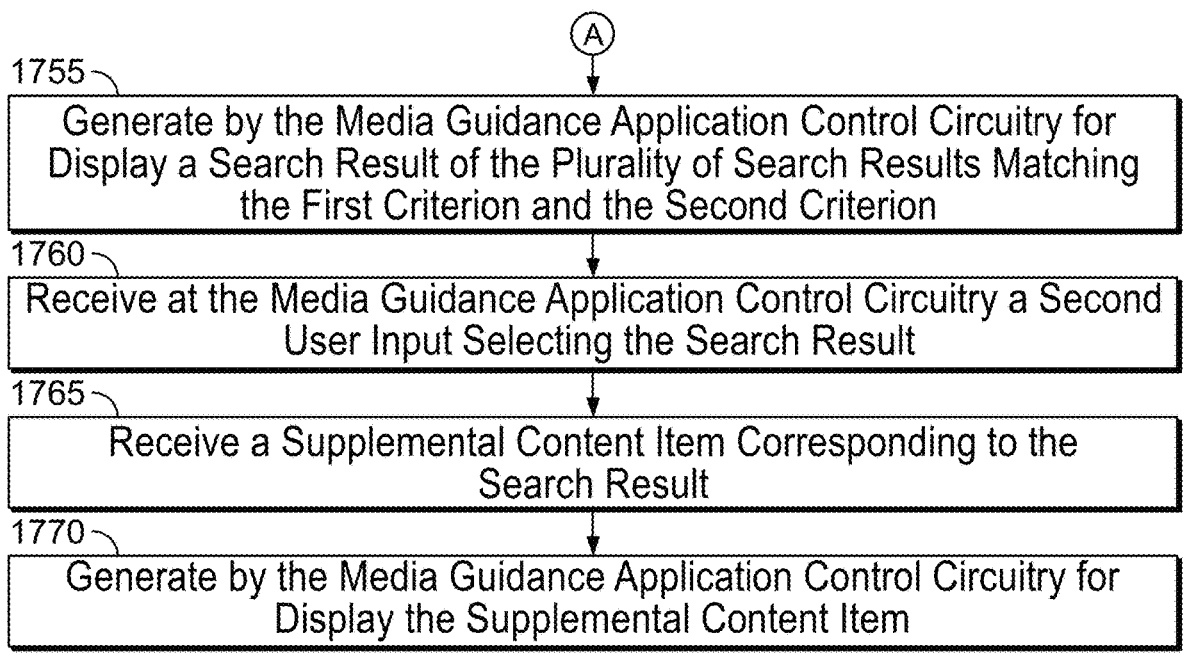

FIG. 17 is a flowchart of illustrative steps of a process 1700 for filtering a search for supplemental content for an ebook in accordance with some embodiments of the disclosure. It should be noted that process 1700 or any step thereof could be performed on, or provided by, any of the devices shown in FIGS. 11-12. For example, process 1700 may be executed by control circuitry 1104 (FIG. 11) as instructed by a media guidance application implemented on a user device (e.g., user equipment devices 1202, 1204, and/or 1206 (FIG. 12)) in order to search for supplemental content. In addition, one or more steps of process 1700 may be incorporated into or combined with one or more steps of any other process or embodiment described herein.

FIG. 17 depicts an illustrative process 1700 for filtering a search query for supplemental content to an ebook using details from an ebook manifest file. At step 1710, a reader of an ebook may initiate a search for supplemental content by selecting a portion of text in an ebook, and the selected portion of text is received by control circuitry 1104 for the media guidance application. For example, a reader may select text from the ebook, or select a highlighted phrase in the ebook, e.g., 250 or 450 (FIGS. 2 and 4, respectively). For example, control circuitry 1104 may receive a user selection of text from the ebook. In some scenarios, the selected portion received by the media guidance application may be automatically received by the media guidance application using an ebook file of ebook text and respective manifest file information, together with information about the ebook text from metadata for the ebook that includes chapter summaries, taglines, keywords, or ebook commentary from book reviews, book seller listings, book blogs, or other ebook information sources.

At step 1715, the control circuitry 1104 for the media guidance application may parse the portion of selected text to determine a keyword in the portion of text. The keyword or keywords parsed from the selected text may be obtained using linguistic analysis to identify terms in the selected text that may be nouns or that may have some significance as determined using metadata from the ebook file, e.g., 820 (FIG. 8). The parsed keyword may be used as a basis for generating a search query at step 1720 by the control circuitry 1104.

The control circuitry 1104 for the user device may transmit the search query at step 1725 to a remote database to search for supplemental content matching the search query.

The remote database or more than one media databases may be searched for supplemental content matching the search query. Metadata for the media items may also be analyzed to find suitable matching content.

A plurality of results from the search of the keyword may be received at step 1730 by the control circuitry 1104 for the media guidance application from the remote database. Since there may be many search results, the results can be filtered to reduce the number of results or to improve the relevance of the results.

At step 1735, the control circuitry 1104 for the media guidance application may retrieve a manifest file for the ebook. The manifest file includes data about the ebook, including a title of the ebook and a chapter of the ebook from which the portion of text was selected. The manifest file, e.g, 830 may be obtained from the ebook file 800 and may include information relevant to the location of the portion of text used to initiate the search query. The manifest file details for the keyword source location can be helpful when identifying a clip of a movie that relates to a certain section of an ebook, or an episode in television series adaptation of the ebook, etc. For example, a search from the Beastly Kendra Chronicles from FIG. 4 or a search from Beauty and the Beast from FIG. 2 may be filtered by a criterion from the respective manifest file.

At step 1740, the control circuitry 1104 for the media guidance application may select a title from the manifest file as a first criterion. Thus for the search for "be our guest" 250 from FIG. 2, the search results may be filtered with a first criterion of the title—Beauty and the Beast. And for a search for "there was my beast face again" 450 from FIG. 4, the search results may be filtered with a first criterion of the respective title—Beastly Kendra Chronicles.

At step 1745 the control circuitry 1104 for the media guidance application may select the chapter, based on the manifest file, as a second criterion. The chapter or location information can be used to find matching media that correlates to the progression in the story.

The control circuitry 1104 for the media guidance application may then use the two criterions to filter the search results at step 1750.

The filtered search results may be included in a final search result list that is generated for display at the user device at step 1755 by the control circuitry 1104 for the media guidance application. The final search result list may include search results matching the keyword and that have been filtered by the criterion identified from the manifest file 830 for the ebook at steps 1740 and 1745. Thus, a plurality of search results for "be our guest" from a search initiated, for example, from the ebook in FIG. 2, may be filtered to remove instances of the American Horror Story episode titled "Be our Guest", for example, and filtered to include only items that are related to the book Beauty and the Beast.

At step 1760, the control circuitry 1104 for the media guidance application, for example, running on the ebook reader may receive a second user input selecting one of the search results in the search list generated at step 1755.

In response to the second user input selection, the user device may receive at step 1765 a supplemental content item corresponding to the selected search result. The supplemental content item may be received from a media content database, e.g., 1216 or other media source. The media content database may be selected for receipt of the supplemental content based on access availability for user and the media guidance application, quality or reliability of the data feed for the content, or based on the type of device on which the supplemental content will be delivered. For example, a television may benefit from a higher resolution source file for the supplemental content, while a portable device may benefit from a lighter or shorter version of the supplemental content. Network availability and capabilities may also influence the choice of media sources.

The received supplemental content item may be viewed in a display at step 1770. In some scenarios, the supplemental content display will be generated on the user device on which the search query was initiated on at step 1710. In other scenarios, the supplemental content display will be generated on a second user device.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 11-12 could be used to perform one or more of the steps in FIG. 17.

The processes discussed above are intended to be illustrative and not limiting. The examples described herein relating to ebooks may also be applied in other media environments. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing supplemental content items to accompany an ebook, comprising:
   receiving input, via a user interface, selecting a portion of text in the ebook displayed on a user device;
   retrieving, at the user device, a manifest file for the ebook, wherein the manifest file comprises a plurality of keywords corresponding to a chapter which corresponds to the portion of text that was selected;

generating, at the user device, a query for a supplemental content item based on one or more of the plurality of keywords from the manifest file corresponding to the chapter which corresponds to the portion of text that was selected;

transmitting, from the user device, the query to a remote database, wherein the remote database is searched for the supplemental content item based on the query;

receiving, at the user device, a portion of the supplemental content item, wherein metadata of the portion of the supplemental content item corresponds to the one or more of the plurality of keywords from the manifest file corresponding to the chapter; and generating for display, at the user device, the portion of the supplemental content item.

2. The method of claim 1, wherein the manifest file indicates a title of the ebook and a chapter name of the ebook from which the portion of text was selected.

3. The method of claim 2, further comprising selecting a first keyword from the plurality of keywords from the manifest file.

4. The method of claim 2, wherein generating the query comprises generating the query based on at least one of: (a) the title, (b) the chapter name, or (c) a first keyword from the plurality of keywords from the manifest file.

5. The method of claim 1, further comprising:
receiving a plurality of search results in response to transmitting the query, the plurality of search results comprising the supplemental content item.

6. The method of claim 5, further comprising:
receiving a user input selecting the supplemental content item from among the plurality of search results.

7. The method of claim 1, further comprising:
parsing, at the user device, the portion of text to determine a second keyword in the portion of text.

8. The method of claim 7, wherein generating the query is further based on the second keyword in the portion of text.

9. The method of claim 1, further comprising:
identifying user preference information for the supplemental content item; and
wherein generating the query is further based on the user preference information.

10. The method of claim 9, further comprising:
identifying content control information for the supplemental content item; and
wherein generating the query is further based on the content control information.

11. A system for providing supplemental content items to accompany an ebook, comprising:
memory configured to store the ebook;
control circuitry configured to:
receive, via a user interface, selecting a portion of text in the ebook displayed on a user device;
retrieve a manifest file for the ebook, wherein the manifest file comprises a plurality of keywords corresponding to a chapter which corresponds to the portion of text that was selected;
generate a query for a supplemental content item based on one or more of the plurality of keywords from the manifest file corresponding to the chapter which corresponds to the portion of text that was selected;
transmit the query to a remote database, wherein the remote database is searched for the supplemental content item based on the query;
receive a portion of the supplemental content item, wherein metadata of the portion of the supplemental content item corresponds to the one or more of the plurality of keywords from the manifest file corresponding to the chapter; and
cause the portion of the supplemental content item to be displayed at the user device.

12. The system of claim 11, wherein the manifest file indicates a title of the ebook and a chapter name of the ebook from which the portion of text was selected.

13. The system of claim 12, wherein the control circuitry is further configured to select a first keyword from the plurality of keywords from the manifest file.

14. The system of claim 12, wherein the control circuitry, when generating the query, is further configured to generate the query based on at least one of: (a) the title; (b) the chapter name; or (c) a first keyword from the plurality of keywords from the manifest file.

15. The system of claim 11, wherein the control circuitry is further configured to receive a plurality of search results in response to transmitting the query, wherein the plurality of search results comprises the supplemental content item.

16. The system of claim 15, wherein the control circuitry is further configured to receive a user input selecting the supplemental content item from among the plurality of search results.

17. The system of claim 11, wherein the control circuitry is further configured to parse the portion of text to determine a second keyword in the portion of text.

18. The system of claim 17, wherein generating the query is further based on the second keyword in the portion of text.

19. The system of claim 11, wherein the control circuitry is further configured to:
identify user preference information for the supplemental content item; and
wherein generating the query is further based on the user preference information.

20. The system of claim 19, wherein the control circuitry is further configured to:
identify content control information for the supplemental content item; and
wherein generating the query is further based on the content control information.

* * * * *